US011967262B2

(12) United States Patent
Chun et al.

(10) Patent No.: US 11,967,262 B2
(45) Date of Patent: Apr. 23, 2024

(54) DISPLAY DEVICE COMPENSATING FOR LIGHT STRESS

(71) Applicant: Samsung Display Co., Ltd., Yongin-si (KR)

(72) Inventors: Byung Ki Chun, Seoul (KR); Hyeonmin Kim, Gwacheon-si (KR); Yongseok Choi, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/949,229

(22) Filed: Sep. 21, 2022

(65) Prior Publication Data

US 2023/0115199 A1 Apr. 13, 2023

(30) Foreign Application Priority Data

Oct. 7, 2021 (KR) ........................ 10-2021-0133388

(51) Int. Cl.
*G09G 3/20* (2006.01)

(52) U.S. Cl.
CPC ..... *G09G 3/2003* (2013.01); *G09G 2310/027* (2013.01); *G09G 2320/0233* (2013.01); *G09G 2320/043* (2013.01); *G09G 2360/16* (2013.01)

(58) Field of Classification Search
None
See application file for complete search history.

(56) References Cited

U.S. PATENT DOCUMENTS

| | | | | |
|---|---|---|---|---|
| 7,957,590 | B2 | 6/2011 | Watanabe et al. | |
| 9,947,265 | B2 | 4/2018 | Park et al. | |
| 11,238,787 | B2 | 2/2022 | An | |
| 11,516,450 | B1 * | 11/2022 | Xie | G06T 5/002 |
| 2008/0181494 | A1 * | 7/2008 | Watanabe | H04N 1/60 382/167 |
| 2008/0211801 | A1 * | 9/2008 | Shiomi | G09G 3/3607 345/214 |
| 2008/0284691 | A1 * | 11/2008 | Chung | G09G 3/3225 345/76 |

(Continued)

FOREIGN PATENT DOCUMENTS

| | | |
|---|---|---|
| KR | 10-2007-0116236 | 12/2007 |
| KR | 10-2008-0081702 | 9/2008 |

(Continued)

*Primary Examiner* — Patrick N Edouard
*Assistant Examiner* — Peijie Shen
(74) *Attorney, Agent, or Firm* — H.C. Park & Associates, PLC

(57) ABSTRACT

A display device includes a display panel, a controller, and a data driver. The display panel includes a plurality of pixels. The controller is configured to: receive input image data for the display panel; divide the display panel into a plurality of first pixel blocks each having a first size; divide the display panel into a plurality of second pixel blocks each having a second size different from the first size; generate, based on the input image data, a first stress map for the plurality of first pixel blocks and a second stress map for the plurality of second pixel blocks; and generate output image data by compensating the input image data based on the first stress map and the second stress map. The data driver is configured to provide data voltages to the plurality of pixels based on the output image data.

14 Claims, 17 Drawing Sheets

(56) References Cited

U.S. PATENT DOCUMENTS

2010/0053222 A1* 3/2010 Kerofsky ............. G09G 3/3406 345/690
2010/0158406 A1* 6/2010 Kim ..................... H04N 19/895 382/254
2012/0281030 A1* 11/2012 Miyata ................. G09G 3/3688 345/690
2013/0063575 A1* 3/2013 Jia ........................ H04N 13/327 348/51
2014/0232741 A1* 8/2014 Choi ...................... H04N 9/643 345/600
2014/0347453 A1* 11/2014 Tanaka ..................... G09G 3/36 348/54
2016/0140895 A1* 5/2016 Park ..................... G09G 3/3208 345/690
2016/0189619 A1* 6/2016 Park ..................... G09G 3/3233 345/77
2017/0162109 A1* 6/2017 An ....................... G09G 3/3208
2017/0236490 A1* 8/2017 Cheon ...................... G09G 5/10 345/691
2018/0012530 A1* 1/2018 Lee ...................... G09G 3/2085
2018/0012563 A1* 1/2018 Lee .......................... G09G 5/10
2018/0020525 A1* 1/2018 Moon ........................ H01J 1/62
2018/0182297 A1* 6/2018 Lee ...................... G09G 3/3258
2019/0164486 A1* 5/2019 An ....................... G09G 3/3233
2019/0221158 A1* 7/2019 An ....................... G09G 3/3266
2020/0211453 A1* 7/2020 Su ........................ G09G 3/3208
2020/0312235 A1* 10/2020 Kim ..................... G09G 3/3225
2020/0380920 A1* 12/2020 Lee ...................... G09G 3/3291
2021/0082341 A1* 3/2021 Cook ................... G09G 3/2044
2021/0158766 A1* 5/2021 Zhao ........................ G09G 3/36
2022/0050594 A1* 2/2022 Kim ........................ G06F 3/064
2023/0005417 A1* 1/2023 Lee ...................... G09G 3/3275

FOREIGN PATENT DOCUMENTS

KR 10-2016-0057504 5/2016
KR 10-2019-0088150 7/2019

* cited by examiner

FIG. 4

310

$$V = \max(R,G,B)$$

330

$$S = \begin{cases} \frac{V-\min(R,G,B)}{V} & \text{if } V \neq 0 \\ 0 & \text{if } V = 0 \end{cases}$$

350

$$H = \begin{cases} \frac{60(G-B)}{V-\min(R,G,B)} & \text{if } V = R \\ 120 + \frac{60(B-R)}{V-\min(R,G,B)} & \text{if } V = G \\ 240 + \frac{60(R-G)}{V-\min(R,G,B)} & \text{if } V = B \end{cases}$$

$$\text{if } H < 0,\ H = H + 360$$

400

$$USV = W1 * SV1 + W2 * SV2$$

$$\left( \begin{array}{c} 0 \leq W1,\ W2 \leq 1 \\ W1 + W2 = 1 \end{array} \right)$$

500

$$ODAT = MAX\left(\frac{IPV-SCMPV}{IPV} * IDAT + SCMPV, IDAT\right)$$

FIG. 14

800

$$C = V * S$$
$$min = V - C$$
$$X = C * \left( 1 - \left| \frac{H}{60} \bmod 2 - 1 \right| \right)$$

850

$$(R, G, B) = \begin{cases} (C+min,\ X+min,\ min) \text{ if } 0 \le H < 60 \\ (X+min,\ C+min,\ min) \text{ if } 60 \le H < 120 \\ (min,\ C+min,\ X+min) \text{ if } 120 \le H < 180 \\ (min,\ X+min,\ C+min) \text{ if } 180 \le H < 240 \\ (X+min,\ min,\ C+min) \text{ if } 240 \le H < 300 \\ (C+min,\ min,\ X+min) \text{ if } 300 \le H < 360 \end{cases}$$

DISPLAY DEVICE COMPENSATING FOR LIGHT STRESS

CROSS-REFERENCE TO RELATED APPLICATIONS

This application claims priority to and the benefit of Korean Patent Application No. 10-2021-0133388, filed Oct. 7, 2021, which is hereby incorporated by reference for all purposes as if fully set forth herein.

BACKGROUND

Field

One or more embodiments generally relate to a display device, and, more particularly, to a display device capable of compensating for light stress.

Discussion

Each pixel of a display device may include a driving transistor that generates a driving current based on a data voltage, and a light emitting element that emits light based on the driving current. In the display device, pixels may emit light with substantially the same luminance at the same gray level. However, a driving transistor of a pixel displaying a 0-gray level or a low gray level may be degraded by light emitted by an adjacent pixel, or by light stress. As such, a threshold voltage of the driving transistor may be shifted. In a case where driving transistors of pixels of a display device are degraded by light stress, the pixels may emit light with different luminance at the same gray level. Further, where the driving transistors are implemented with n-type metal oxide semiconductor (NMOS) transistors, a shift of the threshold voltage of the driving transistors caused by light stress may be intensified.

The above information disclosed in this section is only for understanding the background of the inventive concepts, and, therefore, may contain information that does not form prior art.

SUMMARY

One or more embodiments provide a display device capable of compensating for light stress.

Additional aspects will be set forth in the detailed description which follows, and, in part, will be apparent from the disclosure, or may be learned by practice of the inventive concepts.

According to an embodiment, a display device includes a display panel, a controller, and a data driver. The display panel includes a plurality of pixels. The controller is configured to: receive input image data for the display panel; divide the display panel into a plurality of first pixel blocks, each of the plurality of first pixel blocks having a first size; divide the display panel into a plurality of second pixel blocks, each of the plurality of second pixel blocks having a second size different from the first size; generate, based on the input image data, a first stress map for the plurality of first pixel blocks and a second stress map for the plurality of second pixel blocks; and generate output image data by compensating the input image data based on the first stress map and the second stress map. The data driver is configured to provide data voltages to the plurality of pixels based on the output image data.

According to an embodiment, a display device includes a display panel, a controller, and a data driver. The display panel includes a plurality of pixels. The controller is configured to: receive input image data for the display panel; determine a hue value for each of the plurality of pixels based on the input image data; divide the display panel into a plurality of pixel blocks; generate a stress map for the plurality of pixel blocks based on the input image data; generate compensated image data by compensating the input image data based on the stress map; determine a saturation value and a brightness value for each of the plurality of pixels based on the compensated image data; generate output image data based on the hue value, the saturation value, and the brightness value for each of the plurality of pixels. The data driver is configured to provide data voltages to the plurality of pixels based on the output image data.

According to an embodiment, a display device includes a display panel, a controller, and a data driver. The display panel includes a plurality of pixels. The controller is configured to: receive input image data for the display panel; determine a hue value for each of the plurality of pixels based on the input image data; divide the display panel into a plurality of first pixel blocks, each of the plurality of first pixel blocks having a first size; divide the display panel into a plurality of second pixel blocks, each of the plurality of second pixel blocks having a second size different from the first size; generate, based on the input image data, a first stress map for the plurality of first pixel blocks and a second stress map for the plurality of second pixel blocks; generate compensated image data by compensating the input image data based on the first stress map and the second stress map; determine a saturation value and a brightness value for each of the plurality of pixels based on the compensated image data; and generate output image data based on the hue value, the saturation value, and the brightness value for each of the plurality of pixels. The data driver is configured to provide data voltages to the plurality of pixels based on the output image data.

According to various embodiments, a display device may generate a stress map and may compensate image data based on the stress map. Accordingly, light stress to each pixel may be compensated.

According to various embodiments, a display device may generate a first stress map for a plurality of first pixel blocks each having a first size and a second stress map for a plurality of second pixel blocks each having a second size different from the first size. In this manner, the display device may compensate image data based on the first stress map and the second stress map. Accordingly, with respect to each pixel, not only light stress by a first pixel spaced apart by a short distance from the pixel, but also light stress by a second pixel spaced apart by a long distance from the pixel may be compensated.

According to various embodiments, a display device may generate output image data based on a hue value of input image data, a saturation value of image data compensated based on a stress map, and a brightness value of the compensated image data. Accordingly, a color change (or a color shift) caused by light stress compensation may be reduced or prevented.

The foregoing general description and the following detailed description are illustrative and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate embodiments of the inventive concepts, and, together with the description, serve to explain principles of the inventive concepts.

FIG. 4 is a diagram for describing an example of an operation of an RGB-to-HSV conversion block according to an embodiment.

FIG. 14 is a diagram for describing an example of an operation of an HSV-to-RGB conversion block according to an embodiment.

DETAILED DESCRIPTION OF SOME EMBODIMENTS

Figure 1:
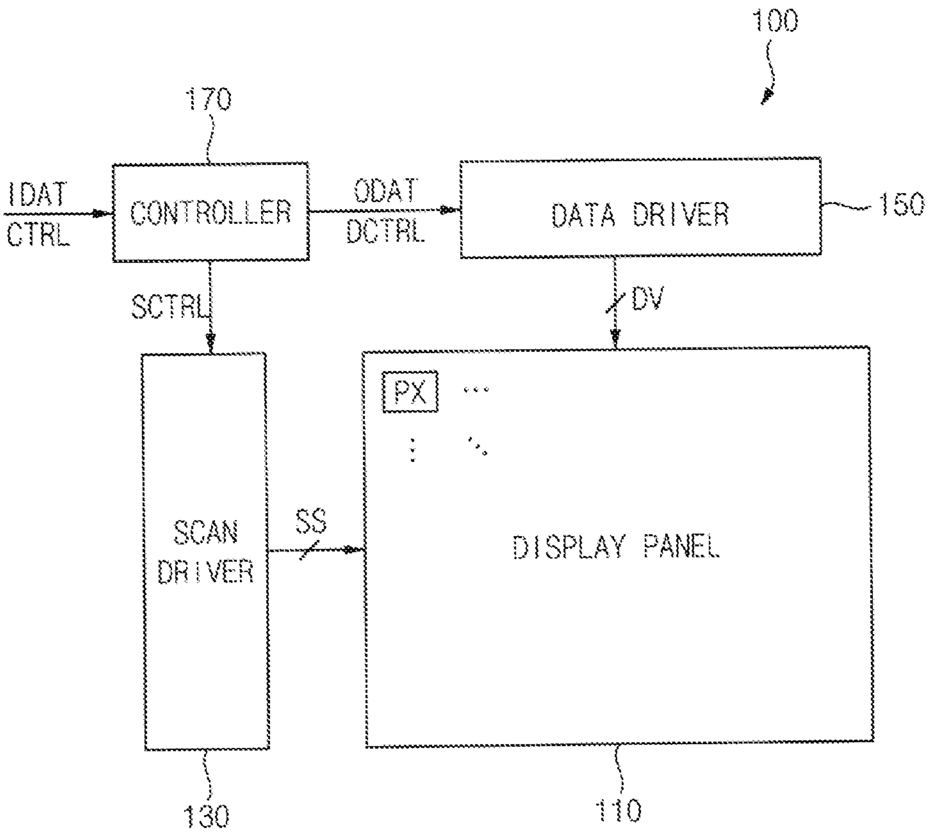
FIG. 1 is a block diagram illustrating a display device according to an embodiment.

In the following description, for the purposes of explanation, numerous specific details are set forth in order to provide a thorough understanding of various embodiments. As used herein, the terms "embodiments" and "implementations" may be used interchangeably and are non-limiting examples employing one or more of the inventive concepts disclosed herein. It is apparent, however, that various embodiments may be practiced without these specific details or with one or more equivalent arrangements. In other instances, well-known structures and devices are shown in block diagram form to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing example features of varying detail of some embodiments. Therefore, unless otherwise specified, the features, components, modules, layers, films, panels, regions, aspects, etc. (hereinafter individually or collectively referred to as an "element" or "elements"), of the various illustrations may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. As such, the sizes and relative sizes of the respective elements are not necessarily limited to the sizes and relative sizes shown in the drawings. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. Other terms and/or phrases used to describe a relationship between elements should be interpreted in a like fashion, e.g., "between" versus "directly between," "adjacent" versus "directly adjacent," "on" versus "directly on," etc. Further, the term "connected" may refer to physical, electrical, and/or fluid connection. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing some embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the inventive concepts. Further, the blocks, units, and/or modules of some embodiments may be physically combined into more complex blocks, units, and/or modules without departing from the inventive concepts.

Hereinafter, various embodiments will be explained in detail with reference to the accompanying drawings.

Figure 2:
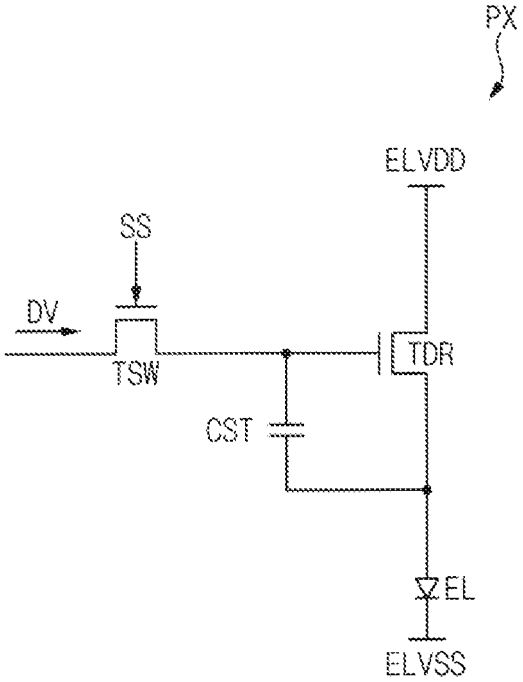
FIG. 2 is a circuit diagram illustrating an example of a pixel included in a display device according to an embodiment.

FIG. 1 is a block diagram illustrating a display device according to an embodiment. FIG. 2 is a circuit diagram illustrating an example of a pixel included in a display device according to an embodiment.

Referring to FIG. 1, a display device 100 according to an embodiment may include a display panel 110 that includes a plurality of pixels PX, a scan driver 130 that provides scan signals SS to the plurality of pixels PX, a data driver 150 that provides data voltages DV to the plurality of pixels PX, and a controller 170 that controls the scan driver 130 and the data driver 150.

The display panel 110 may include a plurality of scan lines, a plurality of data lines, and the plurality of pixels PX coupled to the plurality of scan lines and the plurality of data lines. In some embodiments, as illustrated in FIG. 2, each pixel PX may include a switching transistor TSW that transfers the data voltage DV to a storage capacitor CST in response to the scan signal SS, the storage capacitor CST that stores the data voltage DV transferred by the switching transistor TSW, a driving transistor TDR that generates a driving current according to the data voltage DV stored in the storage capacitor CST, and a light emitting element EL that emits light based on the driving current flowing from a line of a first power supply voltage ELVDD to a line of a second power supply voltage ELVSS. In some embodiments, the light emitting element EL may be, but is not limited to, an organic light emitting diode (OLED). For example, the light emitting element EL may be a quantum dot (QD) light emitting element or any other light emitting element, such as an inorganic light emitting element.

In a case where each pixel PX displays a 0-gray level or a low gray level, the driving transistor TDR of the pixel PX may be degraded (e.g., light degradation) by light emitted by an adjacent pixel, or by light stress. Thus, a threshold voltage of the driving transistor TDR may be shifted (e.g., a negative shift). For example, although the driving transistor TDR of a pixel PX displaying a gray level higher than or equal to a reference gray level may not be degraded by light emitted by an adjacent pixel, the driving transistor TDR of a pixel PX displaying a gray level lower than a reference gray level may be degraded by light emitted by an adjacent pixel. In some embodiments, the driving transistor TDR may be implemented with an oxide transistor or an n-type metal oxide semiconductor (NMOS) transistor. In this case, the light degradation of the driving transistor TDR may be intensified, and the negative shift of the threshold voltage of the driving transistor TDR may be intensified.

Although FIG. 2 illustrates an example where all transistors TSW and TDR are implemented with NMOS transistors, in other embodiments, at least one of the transistors TSW and TDR may be implemented with a p-type metal oxide semiconductor (PMOS) transistor or a low temperature polycrystalline silicon (LTPS) transistor. Further, although FIG. 2 illustrates an example where each pixel PX has a 2T1C structure including two transistors TSW and TDR and one capacitor CTS, each pixel PX of the display device 100 according to some embodiments is not limited to the 2T1C structure, and may have any pixel structure.

The scan driver 130 may generate the scan signals SS based on a scan control signal SCTRL received from the controller 170, and may provide (e.g., sequentially provide) the scan signals SS to the plurality of pixels PX on a row-by-row basis through the plurality of scan lines. In some embodiments, the scan control signal SCTRL may include, but is not limited to, a scan start signal, a scan clock signal, etc. In some embodiments, the scan driver 130 may be integrated or formed in a peripheral portion adjacent to a display region of the display panel 110. In other embodiments, the scan driver 130 may be integrated or formed in at least a portion of the display region of the display panel 110. In still other embodiments, the scan driver 130 may be implemented in a form of an integrated circuit.

The data driver 150 may generate the data voltages DV based on output image data ODAT and a data control signal DCTRL received from the controller 170, and may provide the data voltages DV to the plurality of pixels PX through the plurality of data lines. In some embodiments, the data control signal DCTRL may include, but is not limited to, a horizontal start signal, an output data enable signal, a load signal, etc. In some embodiments, the data driver 150 and the controller 170 may be implemented with a single integrated circuit, and the single integrated circuit may be referred to as a timing controller embedded data driver (TED). In other embodiments, the data driver 150 and the controller 170 may be implemented with separate integrated circuits.

The controller 170 (e.g., a timing controller (TCON)) may receive input image data DAT and a control signal CTRL from an external host processor (e.g., an application processor (AP), a graphics processing unit (GPU), a graphics card, etc.). For example, the input image data DAT may be, but is not limited to, RGB image data including red image data, green image data and blue image data. In some embodiments, the control signal CTRL may include, but is not limited to, a vertical synchronization signal, a horizontal synchronization signal, an input data enable signal, a master clock signal, etc. The controller 170 may control an operation of the scan driver 130 by providing the scan control signal SCTRL to the scan driver 130, and may control an operation of the data driver 150 by providing the output image data ODAT and the data control signal DCTRL to the data driver 150.

In the display device 100 according to some embodiments, the controller 170 may divide the display panel 110 into a plurality of pixel blocks, may generate a stress map representing a plurality of block stress values for the plurality of pixel blocks based on the input image data DAT, and may generate the output image data ODAT by compensating the input image data DAT based on the stress map. The driving transistor TDR of the pixel PX displaying a 0-gray level or a low gray level may be degraded by light emitted by an adjacent pixel, or by the light stress. Thus, in a case where at least a portion of the pixels PX of the display panel 110 are degraded by the light stress, the pixels PX of the display panel 110 may not emit light with uniform luminance. However, in the display device 100 according to various embodiments, the input image data DAT may be compensated based on the stress map, and thus, the light stress to each pixel PX may be compensated.

In some embodiments, the controller 170 (e.g., a controller 200 of FIG. 3, a controller 200*a* of FIG. 11, or a controller 200*b* of FIG. 12) may generate a first stress map for a plurality of first pixel blocks each having a first size and a second stress map for a plurality of second pixel blocks each having a second size different from the first size, and may compensate the input image data IDAT based on the first stress map and the second stress map. Accordingly, with respect to each pixel PX, not only a light stress by a first pixel PX spaced apart by a first distance (e.g., a short distance) from the pixel PX, but also a light stress by a second pixel PX spaced apart by a second distance (e.g., a long distance) from the pixel PX may be compensated.

In other embodiments, the controller 170 (e.g., a controller 700 of FIG. 13 or a controller 700*a* of FIG. 16) may generate the output image data ODAT based on a hue value of the input image data IDAT and saturation and brightness values of compensated image data that are compensated based on a stress map. Accordingly, a color change (or a color shift) caused by light stress compensation may be reduced or prevented.

In still other embodiments, the controller 170 (e.g., a controller 1000 of FIG. 17) may generate a first stress map for the plurality of first pixel blocks and a second stress map for the plurality of second pixel blocks, and may generate the output image data ODAT based on the hue value of the input image data IDAT and saturation and brightness values of compensated image data that are compensated based on the first and second stress maps. Accordingly, not only a light stress by the pixel PX spaced apart by a short distance, but also a light stress by the pixel PX spaced apart by a long distance may be compensated, and the color change (or color shift) caused by the light stress compensation may be reduced or prevented.

Figure 3:
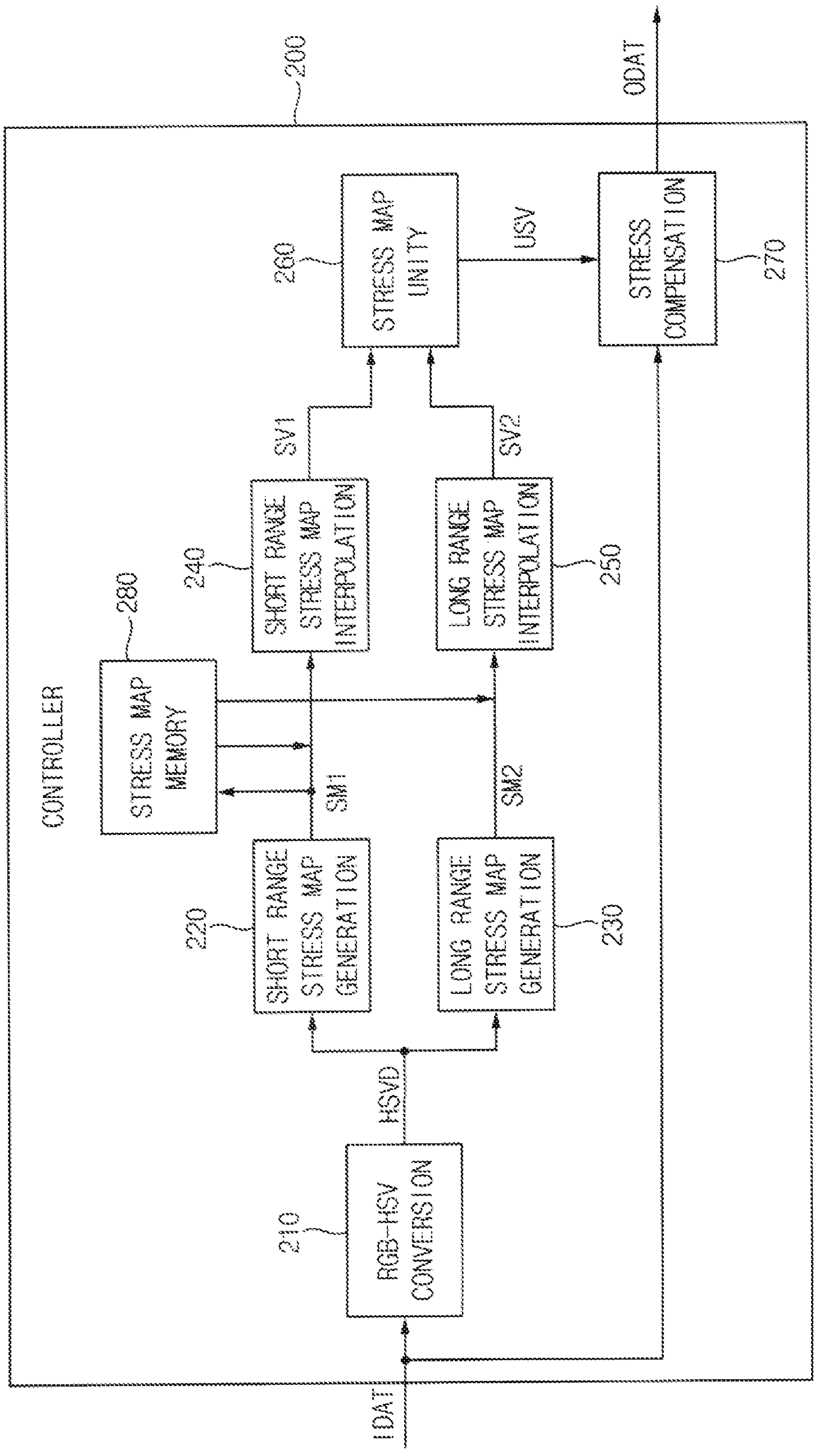
FIG. 3 is a block diagram illustrating a controller included in a display device according to an embodiment.
Figure 5:
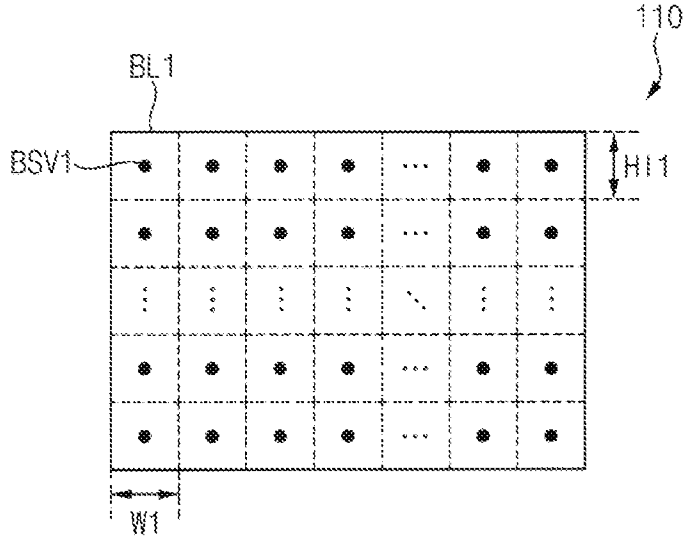
FIG. 5 is a diagram for describing an example of a first stress map generated by a first stress map generation block according to an embodiment.
Figure 6:
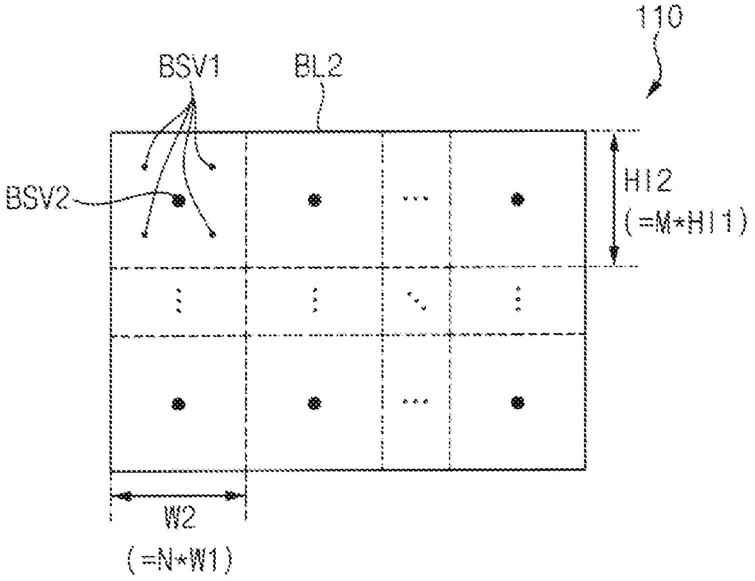
FIG. 6 is a diagram for describing an example of a second stress map generated by a second stress map generation block according to an embodiment.
Figures 7, 8:
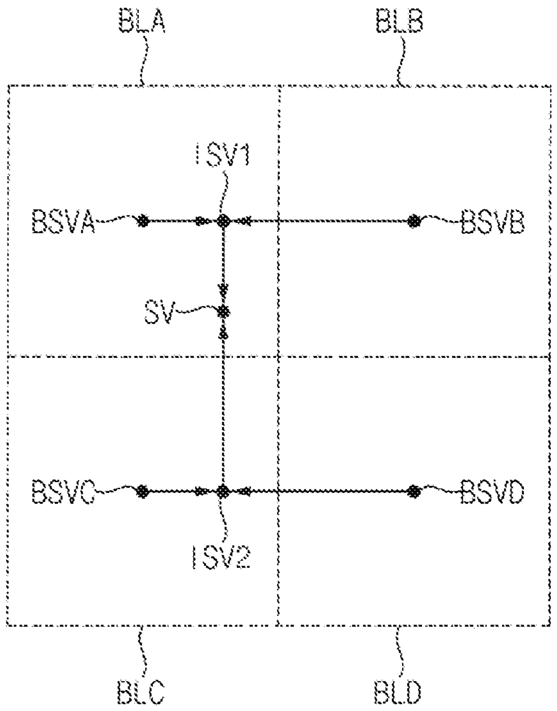
FIG. 7 is a diagram for describing an example of an operation of each of first and second stress map interpolation blocks according to an embodiment.
FIG. 8 is a diagram for describing an example of an operation of each of a stress map unity block according to an embodiment.
Figures 9A, 9B:
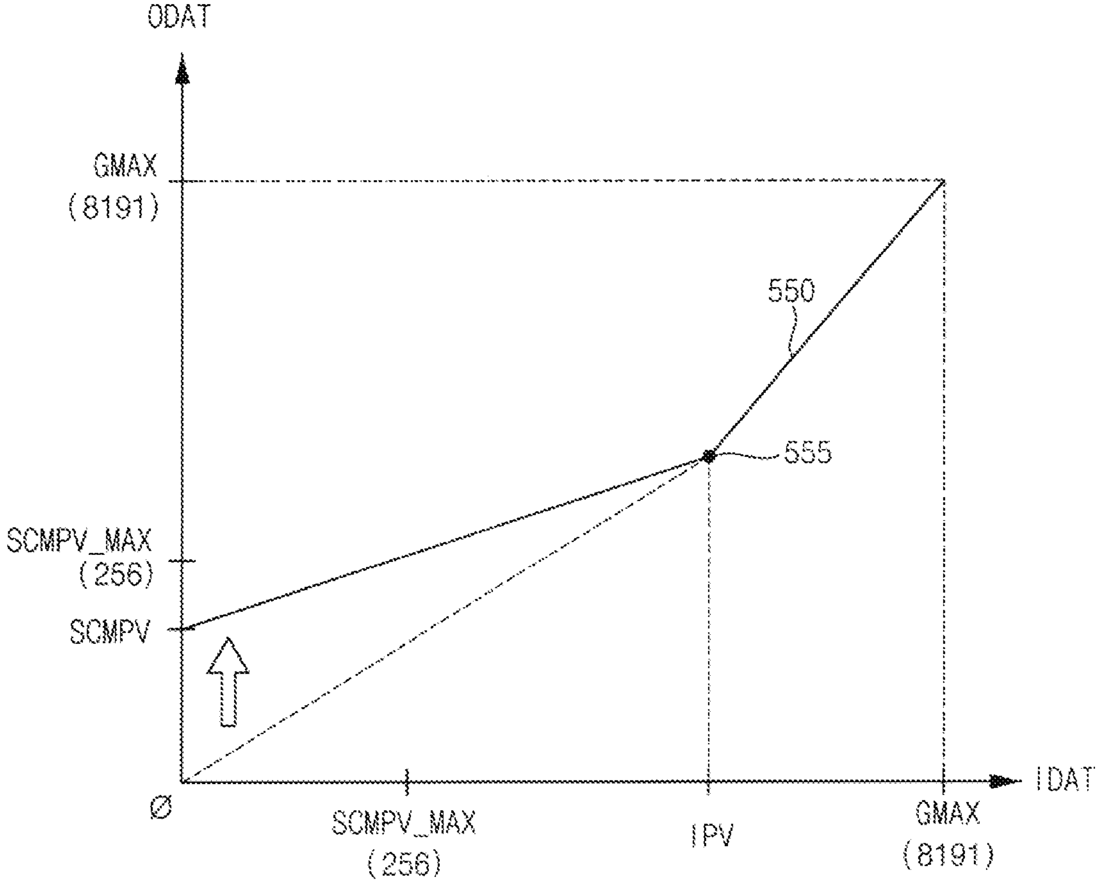
FIG. 9A is a diagram illustrating an example of an equation used by a stress compensation block according to an embodiment.
FIG. 9B is a diagram illustrating an example of a relationship between input image data and output image data according to an embodiment.

FIG. 3 is a block diagram illustrating a controller included in a display device according to an embodiment. FIG. 4 is a diagram for describing an example of an operation of an RGB-to-HSV conversion block according to an embodiment. FIG. 5 is a diagram for describing an example of a first stress map generated by a first stress map generation block according to an embodiment. FIG. 6 is a diagram for describing an example of a second stress map generated by a second stress map generation block according to an embodiment. FIG. 7 is a diagram for describing an example of an operation of each of first and second stress map interpolation blocks according to an embodiment. FIG. 8 is a diagram for describing an example of an operation of each of a stress map unity block according to an embodiment. FIG. 9A is a diagram illustrating an example of an equation used by a stress compensation block according to an embodiment. FIG. 9B is a diagram illustrating an example of a relationship between input image data and output image data according to an embodiment.

Referring to FIG. 3, a controller 200 may receive input image data IDAT for a display panel. The controller 200 may divide the display panel into a plurality of first pixel blocks each having a first size, and may divide the display panel into a plurality of second pixel blocks each having a second size different from the first size. The controller 200 may generate a first stress map SM1 for the plurality of first pixel blocks and a second stress map SM2 for the plurality of second pixel blocks based on the input image data IDAT, and may generate output image data ODAT by compensating the input image data IDAT based on the first stress map SM1 and the second stress map SM2. To perform these operations, the controller 200 according to some embodiments may include an RGB-to-HSV conversion block 210, a first stress map generation block 220, a second stress map generation block 230, a first stress map interpolation block 240, a second stress map interpolation block 250, a stress map unity block 260, and a stress compensation block 270. In some embodiments, the controller 200 may further include a stress map memory 280.

The RGB-to-HSV conversion block 210 may extract or calculate brightness values (or values) for a plurality of pixels of the display panel based on the input image data IDAT. In some embodiments, to obtain the brightness values for the plurality of pixels, the RGB-to-HSV conversion block 210 may convert the input image data IDAT having an RGB image data format or including red image data, green image data and blue image data for each pixel into HSV data HSVD including a hue component (or a hue value), a saturation component (or a saturation value) and a brightness component (or a brightness value) for the pixel PX.

For example, as illustrated in FIG. 4, the RGB-to-HSV conversion block 210 may determine image data (e.g., max(R, G, B)) having a maximum value among the red image data R, the green image data G, and the blue image data B for each pixel as the brightness value V for the pixel according to an equation 310. Further, according to an equation 330, the RGB-to-HSV conversion block 210 may determine the saturation value S for the pixel as 0 in a case where the brightness value V for the pixel is 0, and may determine the saturation value S for the pixel as "(V−min(R, G, B))/V" in a case where the brightness value V for the pixel is not 0, where V represents the brightness value for the pixel, and min(R, G, B) represents image data having a minimum value among the red image data R, the green image data G, and the blue image data B for the pixel. Further, according to an equation 350, the RGB-to-HSV conversion block 210 may determine the hue value H for the pixel as "60(G−B)/(V−min(R, G, B))" in a case where the brightness value V for the pixel is the red image data R for the pixel, may determine the hue value H for the pixel as "120+60(B−R)/(V−min(R, G, B))" in a case where the brightness value V for the pixel is the green image data G for the pixel, and may determine the hue value H for the pixel as "240+60(R−G)/(V−min(R, G, B))" in a case where the brightness value V for the pixel is the blue image data B for the pixel. Further, in a case where the hue value H determined as described above is less than 0, the RGB-to-HSV conversion block 210 may add 360 to the hue value H. Although FIG. 4 illustrates an example of RGB-to-HSV conversion, the RGB-to-HSV conversion performed by the RGB-to-HSV conversion block 210 is not limited to the example of FIG. 4.

As illustrated in FIG. 5, the first stress map generation block 220 may divide the display panel 110 into the plurality of first pixel blocks BL1 each having the first size, and may generate the first stress map SM1 representing first block stress values BSV1 of the plurality of first pixel blocks BL1 based on the HSV data HSVD converted from the input image data IDAT. Further, as illustrated in FIG. 6, the second stress map generation block 230 may divide the display panel 110 into the plurality of second pixel blocks BL2 each having the second size, and may generate the second stress map SM2 representing second block stress values BSV2 of the plurality of second pixel blocks BL2 based on the HSV data HSVD converted from the input image data IDAT.

In some embodiments, the first stress map generation block 220 may calculate the first block stress values BSV1 of the plurality of first pixel blocks BL1 by calculating an average of the brightness values for the pixels included in each of the plurality of first pixel blocks BL1, and may generate the first stress map SM1 representing the first block stress values BSV1 with respect to the plurality of first pixel blocks BL1. Further, the second stress map generation block 230 may calculate the second block stress values BSV2 of the plurality of second pixel blocks BL2 by calculating an average of the brightness values for the pixels included in each of the plurality of second pixel blocks BL2, and may generate the second stress map SM2 representing the second block stress values BSV2 with respect to the plurality of second pixel blocks BL2.

In other embodiments, the second stress map generation block 230 may not calculate the average of the brightness values for the pixels included in each of the plurality of second pixel blocks BL2, but may calculate an average of the first block stress values BSV1 of the plurality of first pixel blocks BL1 included in each second pixel block BL2 to calculate the second block stress value BSV2 of the second pixel block BL2, and may generate the second stress map SM2 representing the second block stress values BSV2 with respect to the plurality of second pixel blocks BL2. For example, as illustrated in FIG. 6, each second pixel block BL2 may include four first pixel blocks BL1, and the second block stress value BSV2 of the second pixel block BL2 may be determined by calculating an average of four first block stress values BSV1 of the four first pixel blocks BL1. Since the second block stress values BSV2 represented by the second stress map SM2 can be readily extracted or calculated from the first block stress values BSV1 represented by the first stress map SM1, the stress map memory 280 may store the first stress map SM1, but may not store the second stress map SM2. In this case, a storage space of the stress map memory 280 may be reduced as compared to a memory storing both of the first and second stress maps SM1 and SM2.

In some embodiments, as illustrated in FIGS. 5 and 6, a second width W2 of each second pixel block BL2 may be N times a first width W1 of each first pixel block BL1, where N is an integer greater than 1, and/or a second height HI2 of each second pixel block BL2 may be M times a first height HI1 of each first pixel block BL1, where M is an integer greater than 1. For example, each first pixel block BL1 may include 32*32 pixels, the second width W2 of each second pixel block BL2 may be a double of the first width W1 of each first pixel block BL1, the second height HI2 of each second pixel block BL2 may be a double of the first height HI1 of each first pixel block BL1, and thus, each second pixel block BL2 may include 64*64 pixels. However, the second width W2 and/or the second height HI2 of each second pixel block BL2 may be any integer multiple of the first width W1 and/or the first height HI1 of each first pixel block BL1. For example, in a case where each first pixel block BL1 includes 32*32 pixels, each second pixel block BL2 may include 32*64 pixels, 64*32 pixels, 32*128 pixels, 128*32 pixels, 64*128 pixels, 128*64 pixels, 128*128 pixels, or any 32N*32M pixels. In this case, even if the stress map memory 280 does not store the second stress map SM2, the second stress map SM2 may be readily recovered or obtained from the first stress map SM1 stored in the stress map memory 280.

Further, as illustrated in FIGS. 5 and 6, each second pixel block BL2 may have a size larger than a size of each first pixel block BL1, and thus, with respect to each pixel, the second stress map SM2 for the plurality of second pixel blocks BL2 may correspond to a light stress by a pixel located far from each pixel compared with the first stress map SM1 for the plurality of first pixel blocks BL1. Accordingly, the first stress map SM1 may be referred to as a short-range stress map, and the second stress map SM2 may be referred to as a long-range stress map. Further, the first stress map generation block 220 may be referred to as a short-range stress map generation block, and the second stress map generation block 230 may be referred to as a long-range stress map generation block.

The first stress map interpolation block 240 may receive the first stress map SM1 from the first stress map generation block 220 or from the stress map memory 280. In some embodiments, the second stress map interpolation block 250 may receive the second stress map SM2 from the second stress map generation block 230. In other embodiments, the second stress map interpolation block 250 may receive the first stress map SM1 from the stress map memory 280, and may extract or calculate the second stress map SM2 from the first stress map SM1. In some embodiments, the first stress map interpolation block 240 may be referred to as a short-range stress map interpolation block, and the second stress map interpolation block 250 may be referred to as a long-range stress map interpolation block.

The first stress map interpolation block 240 may calculate a first stress value SV1 for each pixel based on the first stress map SM1, and the second stress map interpolation block 250 may calculate a second stress value SV2 for each pixel based on the second stress map SM2. In some embodiments, the first stress map interpolation block 240 may calculate the first stress value SV1 for each pixel by performing a bilinear interpolation operation on the first block stress values BSV1 of the first stress map SM1, and the second stress map interpolation block 250 may calculate the second stress value SV2 for each pixel by performing a bilinear interpolation operation on the second block stress values BSV2 of the second stress map SM2.

For example, as illustrated in FIG. 7, to calculate a stress value SV (e.g., the first stress value SV1 or the second stress value SV2) for each pixel, each of the first and second stress map interpolation blocks 240 and 250 may perform the bilinear interpolation operation on four block stress values BSVA, BSVB, BSVC and BSVD of four pixel blocks BLA, BLB, BLC, and BLD (e.g., four first pixel blocks BL1 or four second pixel blocks BL2). For example, each of the first and second stress map interpolation blocks 240 and 250 may calculate a first intermediate stress value ISV1 by performing a linear interpolation operation on two block stress values BSVA and BSVB of two pixel blocks BLA and BLB, and may calculate a second intermediate stress value ISV2 by performing a linear interpolation operation on two block stress values BSVC and BSVD of other two pixel blocks BLC and BLD. Further, pixel, each of the first and second stress map interpolation blocks 240 and 250 may calculate the stress value SV for the pixel by performing a linear interpolation operation on the first intermediate stress value ISV1 and the second intermediate stress value ISV2.

The stress map unity block 260 may receive the first stress value SV1 for each pixel from the first stress map interpolation block 240, may receive the second stress value SV2 for the pixel from the second stress map interpolation block 250, and may generate a united stress value USV for the pixel. For example, the stress map unity block 260 may generate the united stress value USV for the pixel by calculating an average (or a weighted average) of the first stress value SV1 and the second stress value SV2 for the pixel.

For example, as illustrated in FIG. 8, according to an equation 400, the stress map unity block 260 may apply a first weight W1 to the first stress value SV1 for each pixel, may apply a second weight W2 to the second stress value SV2 for the pixel, and may calculate "W1*SV1+W2*SV2" as the united stress value USV for the pixel. Here, each of the first weight W1 and the second weight W2 may be greater than or equal to 0 and less than 1, and a sum of the first weight W1 and the second weight W2 may be 1.

The stress compensation block 270 may generate output image data ODAT for each pixel by compensating the input image data IDAT for the pixel based on the united stress value USV for each the pixel. For example, the stress compensation block 270 may calculate the output image data ODAT for each pixel by adding a stress compensation value to the input image data IDAT for the pixel. The stress compensation value for each pixel may increase as the united stress value USV for the pixel increases, and may decrease as a gray level of the input image data IDAT for the pixel increases. Thus, as the united stress value USV for the pixel increases, or as a light stress to the pixel increases, the stress compensation value added to the input image data IDAT may be increased. Further, as the gray level of the input image data IDAT becomes lower, or in a case where the pixel displays a lower gray level, the stress compensation value added to the input image data IDAT may be increased.

As an intensity of light emitted by a pixel adjacent to each pixel increases, or as a light stress to each pixel increases, degradation (e.g., light degradation) of a driving transistor of each pixel may be increased. Further, as each pixel displays a lower gray level, the degradation (e.g., the light degradation) of the driving transistor of each pixel may be increased. However, in a display device including the controller 200 according to some embodiments, even if the light stress is applied to the pixel for which the input image data IDAT represents a low gray level, the pixel may be driven based on the output image data ODAT that is increased by the stress compensation value from the input image data ODAT. Accordingly, the pixel may display a gray level higher than the low gray level represented by the input image data IDAT, and the degradation or the light degradation of the driving transistor of the pixel may be reduced or prevented.

In some embodiments, as illustrated in FIGS. 9A and 9B, the stress compensation block 270 may determine a stress compensation reference value SCMPV corresponding to the united stress value USV for each pixel. Here, the stress compensation reference value SCMPV may be the stress compensation value added to the input image data IDAT in a case where the input image data IDAT represents a minimum gray level, or a 0-gray level.

For example, the stress compensation block 270 may determine the stress compensation reference value SCMPV for each pixel as a stress compensation reference minimum value (e.g., 0) in a case where the united stress value USV for the pixel is a minimum value (e.g., 0), and may determine the stress compensation reference value SCMPV for the pixel as a stress compensation reference maximum value SCMP_MAX (e.g., 256) in a case where the united stress value USV for the pixel is a maximum value (e.g., 8191). Further, in some embodiments, the stress compensation block 270 may determine the stress compensation reference value SCMPV for each pixel in linear proportion to the united stress value USV for the pixel. FIG. 9B illustrates an example where the input image data DAT and the output image data ODAT for each pixel have a range of 8192 gray levels from a 0-gray level to an 8191-gray level, or have thirteen bits, but a gray range of the input image data DAT and the output image data ODAT is not limited to the example of FIG. 9B. Further, although FIG. 9B illustrates an example where the stress compensation reference value SCMPV has a range from 0 to 256, the range of the stress compensation reference value SCMPV is not limited to the example of FIG. 9B.

According to an equation 500, the stress compensation block 270 may output the input image data DAT for each pixel as the output image data ODAT for the pixel in a case where the input image data DAT for the pixel is greater than or equal to an inflection point value IPV (or in a case where the input image data IDAT is greater than or equal to "(IPV−SCMPV)*IDAT/IPV+SCMPV". In some embodiments, the inflection point value IPV may be set by a manager or a user while the display device is manufactured or while the display device operates. For example, the inflection point value IPV may be set between the stress compensation reference maximum value SCMP_MAX (e.g., 256) and the maximum gray level GMAX (e.g., 8191), but is not limited thereto. Accordingly, in this case, as illustrated in FIG. 9B, a line 550 representing a relationship between the input image data DAT and the output image data ODAT may be a straight line having a slope of 1 from an inflection point 555 corresponding to the inflection point value IPV.

Further, according to the equation 500, the stress compensation block 270 may calculate the output image data ODAT for each pixel by using an equation "ODAT=(IPV−SCMPV)*IDAT/IPV+SCMPV" in a case where the input image data IDAT for the pixel is less than the inflection point value IPV, where ODAT represents the output image data, IPV represents the inflection point value, SCMPV represents the stress compensation reference value, and IDAT represents the input image data. Accordingly, as illustrated in FIG. 9B, in the case where the input image data IDAT is less than the inflection point value IPV, the line 550 representing the relationship between the input image data IDAT and the output image data ODAT may be a straight line from a coordinate of "(0, SCMPV)" to the inflection point 555 (or a coordinate of "(IPV, IPV)"). Thus, in a case where a light stress is applied to each pixel, and the input image data IDAT for the pixel represents a low gray level (e.g., a gray level lower than the inflection point value IPV), the stress compensation block 270 may increase the output image data ODAT for the pixel compared with the input image data IDAT for the pixel. Further, a pixel displaying a high gray level may not be decreased by light of an adjacent pixel, or by a light stress. Thus, by the increase of the output image data ODAT for the pixel by the stress compensation block 270, the light stress to the pixel may be compensated, and the degradation or the light degradation of the driving transistor of the pixel may be reduced or prevented.

As described above, the controller 200 according to some embodiments may generate the first stress map SM1 for the plurality of first pixel blocks BL1 each having the first size and the second stress map SM2 for the plurality of second pixel blocks BL2 each having the second size different from the first size, and may compensate the input image data IDAT based on the first stress map SM1 and the second stress map SM2. Accordingly, with respect to each pixel, not only a light stress by a first pixel spaced apart by a first distance (e.g., a short distance) from the pixel, but also a light stress by a second pixel spaced apart by a second distance (e.g., a long distance) from the pixel may be compensated.

Figure 10:
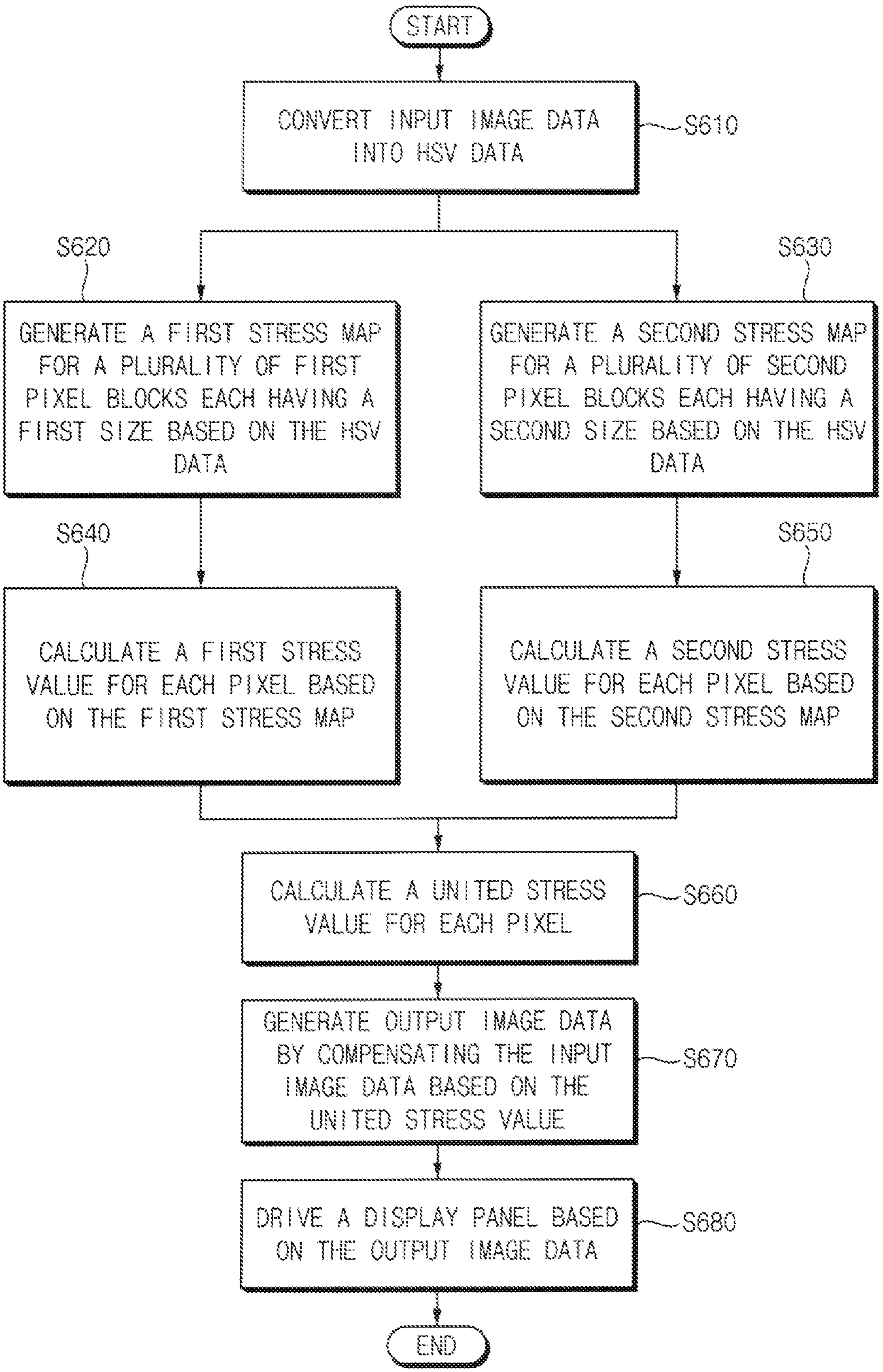
FIG. 10 is a flowchart illustrating a method of operating a display device according to an embodiment.

FIG. 10 is a flowchart illustrating a method of operating a display device according to an embodiment.

Referring to FIGS. 3 and 10, an RGB-to-HSV conversion block 210 of a controller 200 may convert input image data IDAT for a display panel into HSV data HSVD (S610). A first stress map generation block 220 of the controller 200 may divide the display panel into a plurality of first pixel blocks each having a first size, and may generate a first stress map SM1 for the plurality of first pixel blocks based on the HSV data HSVD (S620). Further, a second stress map generation block 230 of the controller 200 may divide the display panel into a plurality of second pixel blocks each having a second size different from the first size, and may generate a second stress map SM2 for the plurality of second pixel blocks based on the HSV data HSVD (S630).

A first stress map interpolation block 240 of the controller 200 may calculate a first stress value SV1 for each of a plurality of pixels by performing a bilinear interpolation operation on the first block stress values of the first stress map SM1 (S640), and a second stress map interpolation block 250 of the controller 200 may calculate a second stress value SV2 for each of the plurality of pixels by performing a bilinear interpolation operation on the second block stress values of the second stress map SM2 (S650).

A stress map unity block 260 of the controller 200 may calculate a united stress value USV for each of the plurality of pixels by applying a first weight to the first stress value SV1 and by applying a second weight to the second stress value SV2 (S660). A stress compensation block 270 of the controller 200 may generate output image data ODAT for each of the plurality of pixels by compensating the input image data IDAT for each of the plurality of pixels based on the united stress value USV for each of the plurality of pixels (S670). A data driver of a display device may receive the output image data ODAT from the controller 200, and may drive the display panel based on the output image data ODAT (S680).

As described above, in a method of operating the display device including the controller 200 according to some embodiments, the first stress map SM1 for the plurality of first pixel blocks BL1 each having the first size and the second stress map SM2 for the plurality of second pixel blocks BL2 each having the second size different from the first size may be generated, and the input image data IDAT may be compensated based on the first stress map SM1 and the second stress map SM2. Accordingly, with respect to each pixel, not only a light stress by a first pixel spaced apart by a first distance (e.g., a short distance) from the pixel, but also a light stress by a second pixel spaced apart by a second distance (e.g., a long distance) from the pixel may be compensated.

Figure 11:
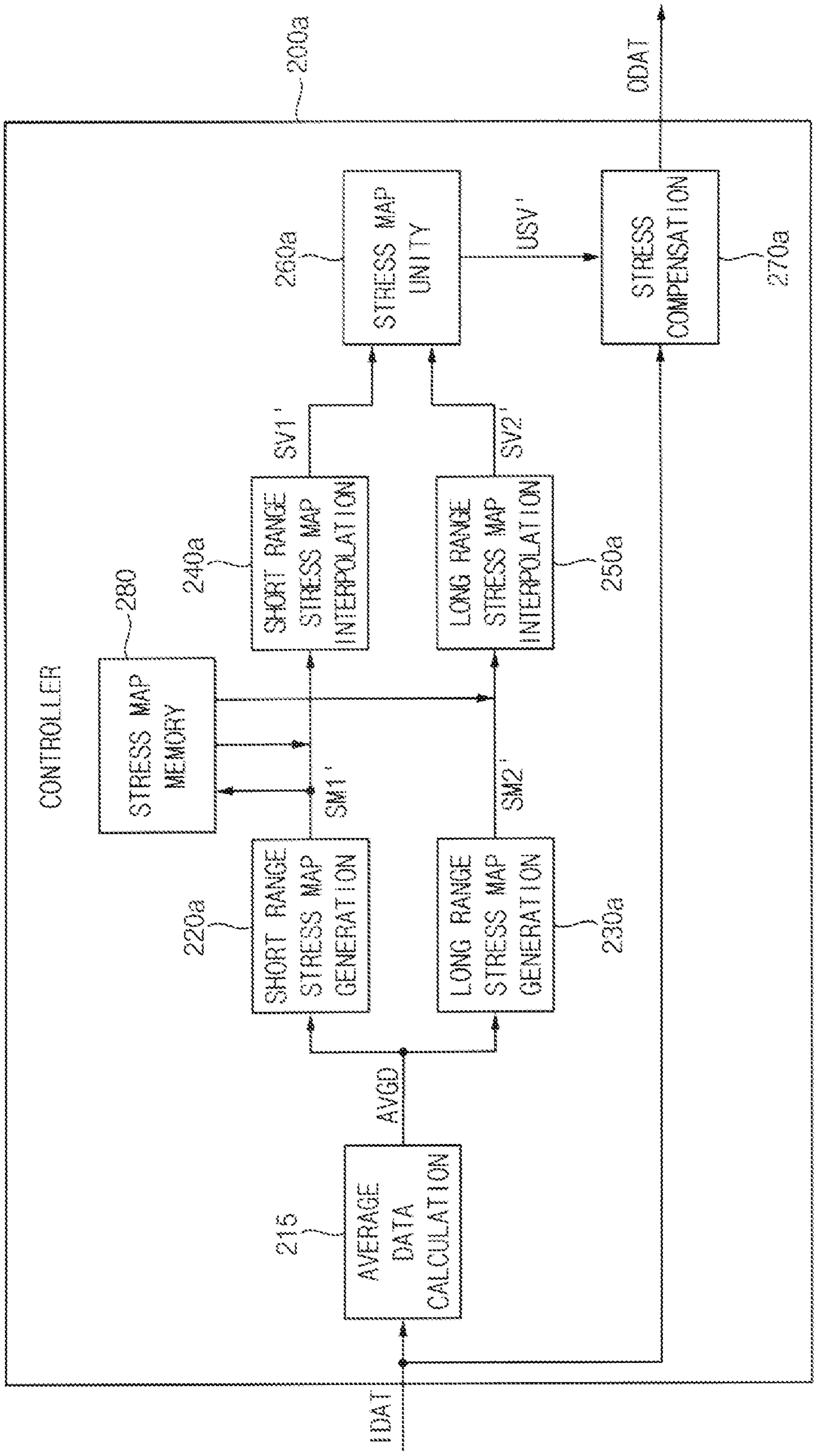
FIG. 11 is a block diagram illustrating a controller included in a display device according to an embodiment.

FIG. 11 is a block diagram illustrating a controller included in a display device according to an embodiment.

Referring to FIG. 11, a controller 200*a* according to some embodiments may include an average data calculation block 215, a first stress map generation block 220*a*, a second stress map generation block 230*a*, a first stress map interpolation block 240*a*, a second stress map interpolation block 250*a*, a stress map unity block 260*a*, a stress compensation block 270*a*, and a stress map memory 280. The controller 200*a* of FIG. 11 may have a similar configuration and a similar operation to the controller 200 of FIG. 3, except that the controller 200*a* may include the average data calculation block 215 instead of an RGB-to-HSV conversion block 210 illustrated in FIG. 3.

The average data calculation block 215 may generate average data AVGD by calculating an average of input image data IDAT for each pixel. For example, the input image data IDAT for each pixel may include red image data, green image data, and blue image data for the pixel, and the average data calculation block 215 may generate average data AVGD for the pixel by calculating an average of the red image data, the green image data, and the blue image data for the pixel.

The first stress map generation block 220*a* may generate a first stress map SM1' representing first block stress values of a plurality of first pixel blocks based on the average data AVGD, and the second stress map generation block 230*a* may generate a second stress map SM2' representing second block stress values of a plurality of second pixel blocks based on the average data AVGD. For example, the first stress map generation block 220*a* may calculate an average of the average data AVGD for pixels included in each first pixel block as the first block stress value of the first pixel block, and the second stress map generation block 230*a* may calculate an average of the average data AVGD for pixels included in each second pixel block as the second block stress value of the second pixel block. In another example, the second stress map generation block 230*a* may not calculate the average of the average data AVGD for the pixels included in each second pixel block, but may calculate an average of the first block stress values of the first pixel blocks included in each second pixel block to calculate the second block stress value of the second pixel block. In some embodiments, the stress map memory 280 may store the first stress map SM1', but may not store the second stress map SM2'.

The first stress map interpolation block 240*a* may calculate a first stress value SV1' for each pixel by performing a bilinear interpolation operation on the first block stress values of the first stress map SM1', and the second stress map interpolation block 250*a* may calculate a second stress value SV2' for each pixel by performing a bilinear interpolation operation on the second block stress values of the second stress map SM2'. The stress map unity block 260*a* may calculate a united stress value USV' for each pixel by applying a first weight to the first stress value SV1' and by applying a second weight to the second stress value SV2'. The stress compensation block 270*a* may generate output image data ODAT for each pixel by compensating the input image data DAT for the pixel based on the united stress value USV' for the pixel.

Figure 12:
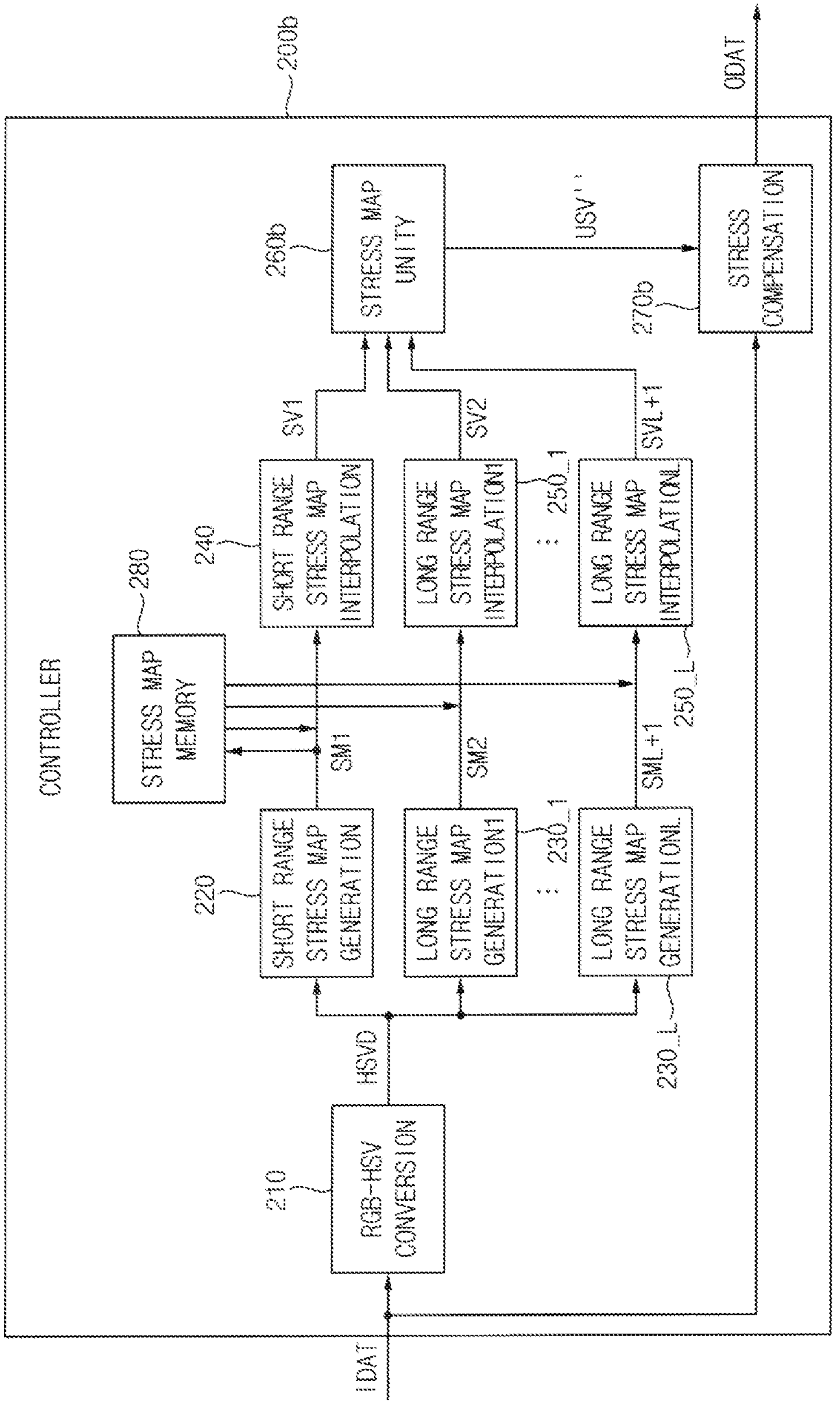
FIG. 12 is a block diagram illustrating a controller included in a display device according to an embodiment.

FIG. 12 is a block diagram illustrating a controller included in a display device according to an embodiment.

Referring to FIG. 12, a controller 200*b* according to some embodiments may include an RGB-to-HSV conversion block 210, a first stress map generation block 220, L second stress map generation blocks 230_1, . . . , 230_L, a first stress map interpolation block 240, L second stress map interpolation blocks 250_1, . . . , 250_L, a stress map unity block 260*b*, a stress compensation block 270*b* and a stress map memory 280, where L is an integer greater than 1. The controller 200*b* of FIG. 12 may have a similar configuration and a similar operation to a controller 200 of FIG. 3, except that the controller 200*b* may include two or more second stress map generation blocks 230_1, . . . , 230_L and two or more second stress map interpolation blocks 250_1, . . . , 250_L.

The first stress map generation block 220 may generate a first stress map SM1, and the L second stress map generation blocks 230_1, . . . , 230_L may generate second through (L+1)-th stress maps SM2, . . . , SML+1 for sets of a plurality of pixel blocks having different sizes. For example, the first stress map generation block 220 may generate the first stress map SM1 for a plurality of first pixel blocks each having a first size, one second stress map generation block 230_1 may generate the second stress map SM2 for a plurality of second pixel blocks each having a second size different from the first size, and another second stress map generation block 230_L may generate the (L+1)-th stress map SML+1 for a plurality of third pixel blocks each having a third size different from the first size and the second size. In some embodiments, sizes of L pixel blocks by the L second stress map generation blocks 230_1, . . . , 230_L may be larger than a size of a pixel block by the first stress map generation block 220. Thus, the first stress map generation block 220 may be referred to as a short-range stress map generation block, and the L second stress map generation blocks 230_1, . . . , 230_L may be referred to as long-range stress map generation blocks.

The first stress map interpolation block 240 may calculate a first stress value SV1 for each pixel based on the first stress map SM1, and the L second stress map interpolation blocks 250_1, . . . , 250_L may calculate second through (L+1)-th stress values SV2, . . . , SVL+1 based on the second through (L+1)-th stress maps SM2, . . . , SML+1. In some embodiments, the first stress map interpolation block 240 may be referred to as a short-range stress map interpolation block, and the L second stress map interpolation blocks 250_1, . . . , 250_L may be referred to as long-range stress map interpolation blocks.

The stress map unity block 260*b* may calculate a united stress value USV" for each pixel by calculating an average (e.g., a weighted average) of the stress values SV1, SV2, . . . , SVL+1 for each pixel, and the stress compensation block 270*b* may generate output image data ODAT for each pixel by compensating the input image data DAT for the pixel based on the united stress value USV" for the pixel. Since the stress values SV1, SV2, . . . , SVL+1 for each pixel are calculated based on three or more stress maps SM1, SM2, . . . , SML+1, the united stress value USV" calculated based on the stress values SV1, SV2, . . . , SVL+1 also may be determined based on the three or more stress maps SM1, SM2, . . . , SML+1. Thus, the controller 200*b* according to some embodiments may compensate the input image data IDAT based on the three or more stress maps SM1, SM2, . . . , SML+1, thereby compensating a light stress of a longer distance (compared with a case using two stress maps).

Figure 13:
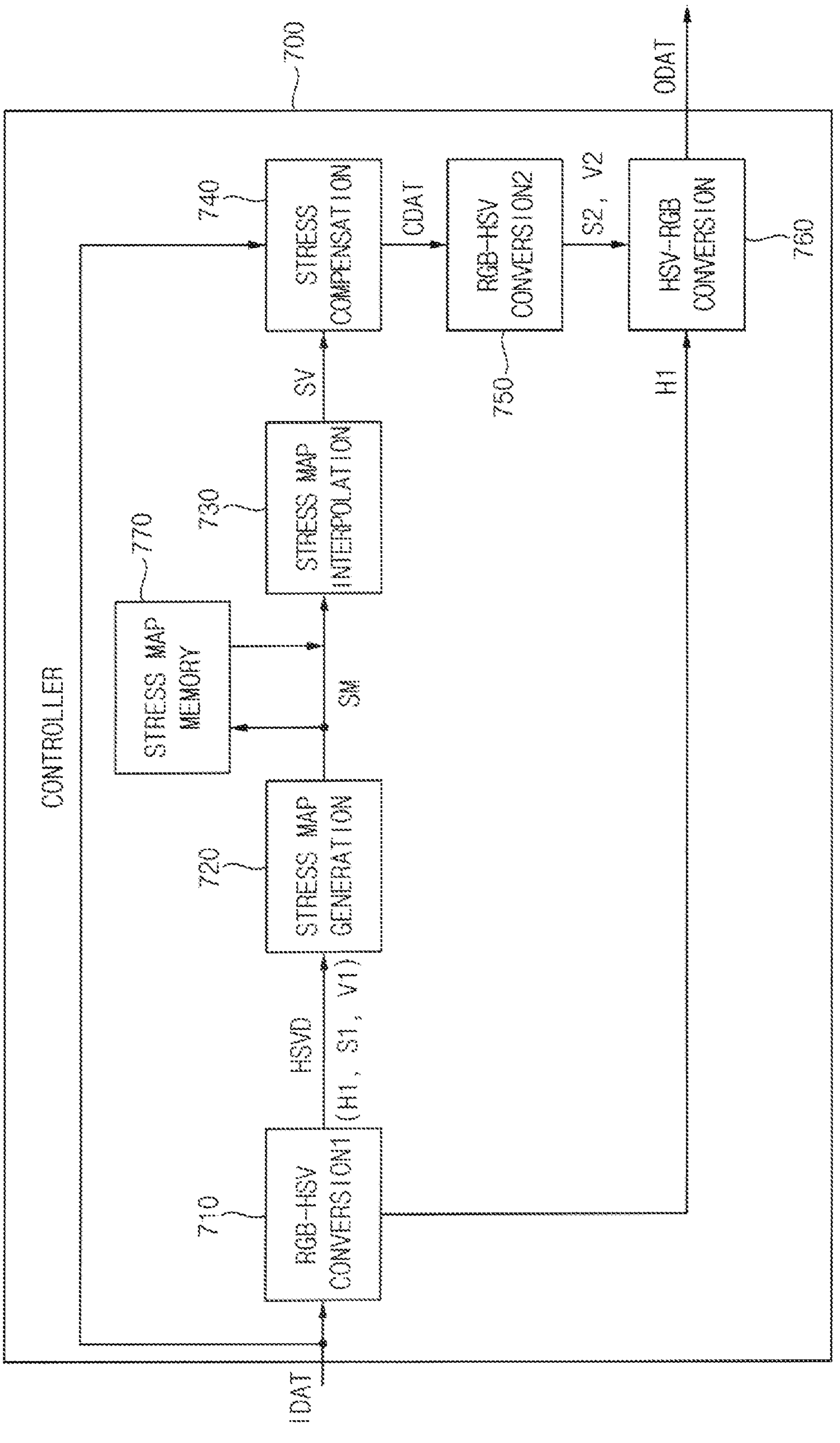
FIG. 13 is a block diagram illustrating a controller included in a display device according to an embodiment.

FIG. 13 is a block diagram illustrating a controller included in a display device according to an embodiment. FIG. 14 is a diagram for describing an example of an operation of an HSV-to-RGB conversion block according to an embodiment.

Referring to FIG. 13, a controller 700 may receive input image data IDAT for a display panel, and may determine a hue value H1 for each pixel based on the input image data IDAT. The controller 700 may divide the display panel into a plurality of pixel blocks, may generate a stress map SM for the plurality of pixel blocks based on the input image data IDAT, may generate compensated image data CDAT by compensating the input image data IDAT based on the stress map SM, and may determine a saturation value S2 and a brightness value V2 for each pixel based on the compensated image data CDAT. With respect to each pixel, the controller 700 may generate output image data ODAT based on the hue value H1 of the input image data IDAT, the saturation value S2 of the compensated image data CDAT and the brightness value V2 of the compensated image data CDAT. In some embodiments, the controller 700 may convert the input image data IDAT into first HSV data HSVD, may determine a hue component of the first HSV data HSVD for each pixel as the hue value H1 for the pixel, may convert the compensated image data CDAT into second HSV data, and may determine a saturation component and a brightness component of the second HSV data for each pixel as the saturation value S2 and the brightness value V2 for the pixel, respectively. Further, the controller 700 may generate the output image data ODAT for each pixel by converting the hue value H1, the saturation value S2 and the brightness value V2 for the pixel into an RGB image data format.

To perform these operations, the controller 700 according to some embodiments may include a first RGB-to-HSV conversion block 710, a stress map generation block 720, a stress map interpolation block 730, a stress compensation block 740, a second RGB-to-HSV conversion block 750, and a HSV-to-RGB conversion block 760. In some embodiments, the controller 700 may further include a stress map memory 770.

The first RGB-to-HSV conversion block 710 may convert the input image data IDAT into the first HSV data HSVD. The first HSV data HSVD may include a hue component, a saturation component, and a brightness component respectively corresponding to a first hue value H1, a first saturation value S1, and a first brightness value V1 with respect to each pixel.

The stress map generation block 720 may divide the display panel into the plurality of pixel blocks, and may generate the stress map SM representing block stress values of the plurality of pixel blocks based on the first HSV data HSVD converted from the input image data IDAT. In some embodiments, the stress map SM generated by the stress map generation block 720 may be stored in the stress map memory 770.

The stress map interpolation block 730 may receive the stress map SM from the stress map generation block 720 or from the stress map memory 770, and may calculate a stress value SV for each pixel based on the stress map SM. For example, the stress map interpolation block 730 may calculate the stress value SV for each pixel by performing a bilinear interpolation operation on the block stress values of the stress map SM.

The stress compensation block 740 may generate the compensated image data CDAT for each pixel by compensating the input image data IDAT for the pixel based on the stress value SV for the pixel. For example, with respect to each pixel, the stress compensation block 740 may add a stress compensation value corresponding to the stress value SV to a gray level represented by the input image data DAT to calculate the compensated image data CDAT corresponding to a sum of the gray level and the stress compensation value. The compensated image data CDAT may be image data for compensating for a light stress for each pixel.

The second RGB-to-HSV conversion block 750 may convert the compensated image data CDAT into the second HSV data. The second HSV data may include a hue component, a saturation component, and a brightness component respectively corresponding to a second hue value H2, a second saturation value S2, and a second brightness value V2 with respect to each pixel.

The HSV-to-RGB conversion block 760 may receive the first hue value H1 of the first HSV data HSVD for each pixel from the first RGB-to-HSV conversion block 710, may receive the second saturation value S2 and the second brightness value V2 of the second HSV data for the pixel from the second RGB-to-HSV conversion block 750, and may generate the output image data ODAT for the pixel by converting the first hue value H1, the second saturation value S2, and the second brightness value V2 for the pixel into an RGB image data format.

For example, as illustrated in FIG. 14, the HSV-to-RGB conversion block 760 may determine a variable C, a variable min, and a variable X with respect to each pixel using an equation 800. For example, the variable C may correspond to a chroma, and may be calculated by "V*S", where V is the brightness value and S is the saturation value. Further, the variable min may be a minimum value among red, green, and blue image data R, G and B for each pixel, and may be calculated by "V−C". Further, the variable X may be an intermediate calculation value for HSV-to-RGB conversion, and may be calculated by "C*(1−|((H/60) mod 2)−1|)", where H is the hue value. Further, according to equation 850, the HSV-to-RGB conversion block 760 may determine red image data R, green image data G, and blue image data B for each pixel. For example, in a case where the hue value H is greater than or equal to 0 and less than 60, the HSV-to-RGB conversion block 760 may determine the red image data R as "C+min", may determine the green image data G as "X+min", and may determine the blue image data B as "min". Further, in a case where the hue value H is greater than or equal to 60 and less than 120, the HSV-to-RGB conversion block 760 may determine the red image data R as "X+min", may determine the green image data G as "C+min", and may determine the blue image data B as "min". Further, in a case where the hue value H is greater than or equal to 120 and less than 180, the HSV-to-RGB conversion block 760 may determine the red image data R as "min", may determine the green image data G as "C+min", and may determine the blue image data B as "X+min". Further, in a case where the hue value H is greater than or equal to 180 and less than 240, the HSV-to-RGB conversion block 760 may determine the red image data R as "min", may determine the green image data G as "X+min", and may determine the blue image data B as "C+min". Further, in a case where the hue value H is greater than or equal to 240 and less than 300, the HSV-to-RGB conversion block 760 may determine the red image data R as "X+min", may determine the green image data G as "min", and may determine the blue image data B as "C+min". Further, in a case where the hue value H is greater than or equal to 300 and less than 360, the HSV-to-RGB conversion block 760 may determine the red image data R as "C+min", may determine the green image data G as "min", and may determine the blue image data B as "X+min". Although FIG. 14 illustrates an example of the HSV-to-RGB conversion, the HSV-to-RGB conversion performed by the HSV-to-RGB conversion block 760 is not limited to the example of FIG. 14.

As described above, in the controller 700 according to some embodiments, since the output image data ODAT is generated based on the second saturation value S2 and the second brightness value V2 of the second HSV data, or the compensated image data CDAT, the output image data ODAT may compensate for a light stress for each pixel. Further, since the output image data ODAT is generated based on the first hue value H1 of the first HSV data HSVD, or the input image data IDAT, the output image data ODAT may have a hue value substantially the same as that of the input image data IDAT, and a color change (or a color shift) caused by light stress compensation may be reduced or prevented in an image displayed based on the output image data ODAT.

Figure 15:
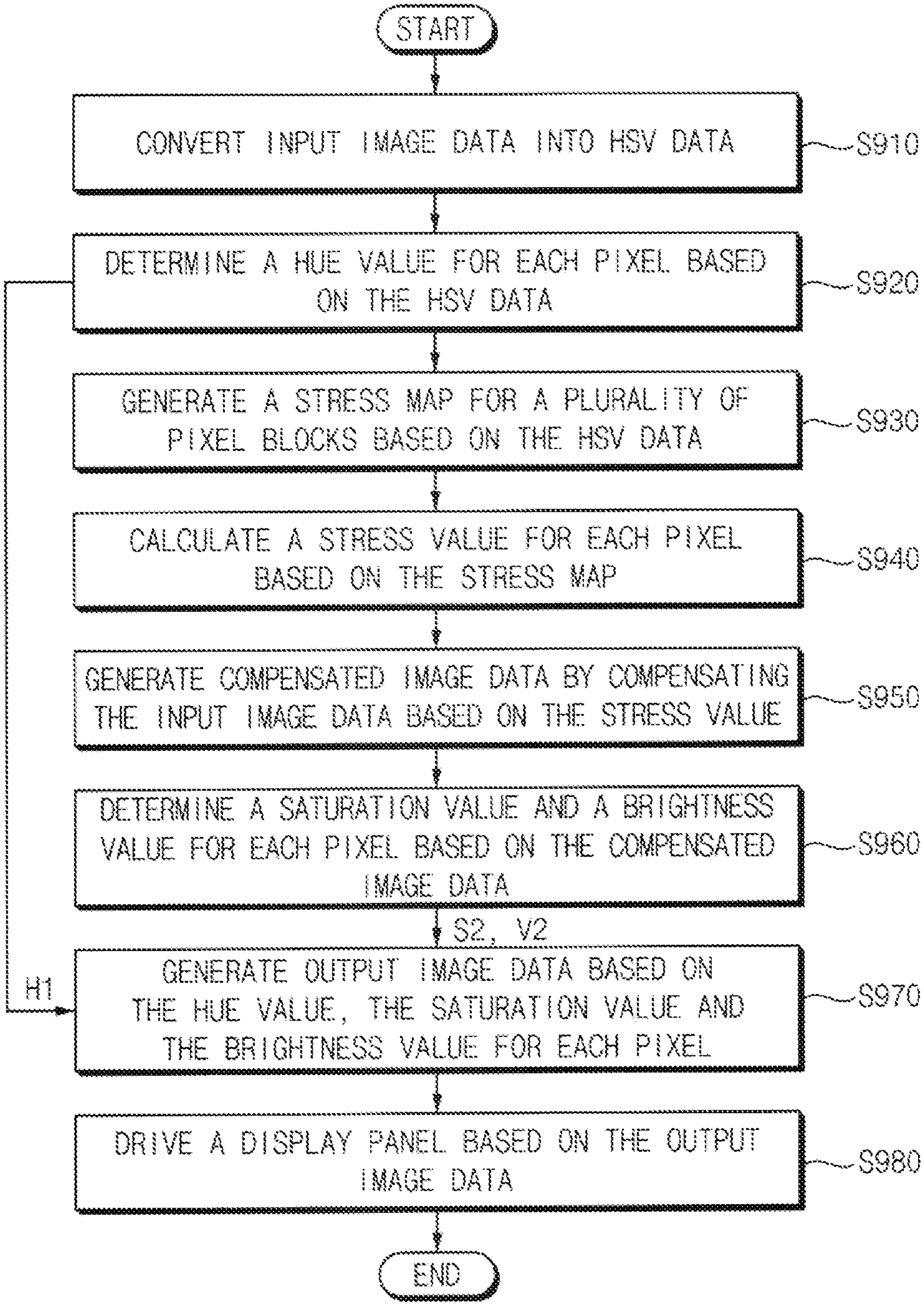
FIG. 15 is a flowchart illustrating a method of operating a display device according to an embodiment.

FIG. 15 is a flowchart illustrating a method of operating a display device according to an embodiment.

Referring to FIGS. 13 and 15, a first RGB-to-HSV conversion block 710 of a controller 700 may convert input image data IDAT into HSV data HSVD (S910). Further, the first RGB-to-HSV conversion block 710 may determine a hue value H1 for each pixel based on the HSV data HSVD (S920). For example, the first RGB-to-HSV conversion block 710 may determine a hue component of the HSV data HSVD for each pixel as the hue value H1 for the pixel.

A stress map generation block 720 of the controller 700 may divide a display panel into a plurality of pixel blocks, and may generate a stress map SM representing block stress values of the plurality of pixel blocks based on the HSV data HSVD converted from the input image data IDAT (S930). A stress map interpolation block 730 of the controller 700 may calculate a stress value SV for each pixel by performing a bilinear interpolation operation on the block stress values of the stress map SM (S940). A stress compensation block 740 of the controller 700 may generate compensated image data CDAT for each pixel by compensating the input image data DAT for the pixel based on the stress value SV for the pixel (S950). A second RGB-to-HSV conversion block 750 of the controller 700 may determine a saturation value S2 and a brightness value V2 for each pixel based on the compensated image data CDAT (S960). For example, the second RGB-to-HSV conversion block 750 may convert the compensated image data CDAT into second HSV data, and may determine a saturation component and a brightness component of the second HSV data for each pixel as the saturation value S2 and the brightness value V2 for the pixel.

A HSV-to-RGB conversion block 760 of the controller 700 may receive the hue value H1 for each pixel from the first RGB-to-HSV conversion block 710, may receive the saturation value S2 and the brightness value V2 for the pixel from the second RGB-to-HSV conversion block 750, and may generate output image data ODAT for the pixel by converting the hue value H1, the saturation value S2, and the brightness value V2 for the pixel into an RGB image data format (S970). A data driver of a display device may receive the output image data ODAT from the controller 700, and may drive the display panel based on the output image data ODAT (S980).

As described above, in a method of operating the display device including the controller 700 according to some embodiments, since the output image data ODAT is generated based on the saturation value S2 and the brightness value V2 of the compensated image data CDAT, the output image data ODAT may compensate for a light stress for each pixel. Further, since the output image data ODAT is generated based on the hue value H1 of the input image data DAT, the output image data ODAT may have a hue value substantially the same as that of the input image data DAT, and a color change (or a color shift) caused by light stress compensation may be reduced or prevented in an image displayed based on the output image data ODAT.

Figure 16:
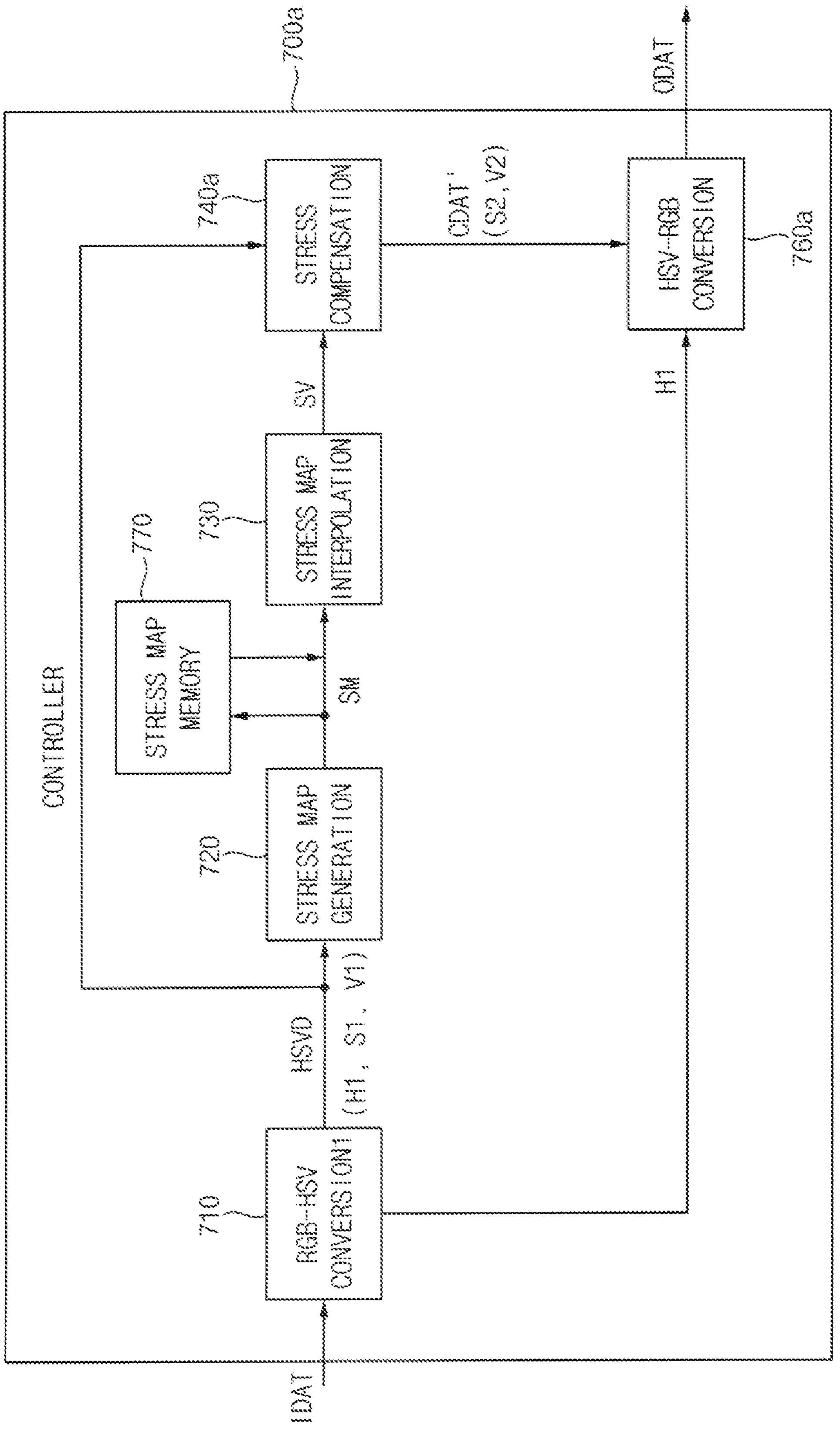
FIG. 16 is a block diagram illustrating a controller included in a display device according to an embodiment.

FIG. 16 is a block diagram illustrating a controller included in a display device according to an embodiment.

Referring to FIG. 16, a controller **700*a* according to some embodiments may include a first RGB-to-HSV conversion block 710, a stress map generation block 720, a stress map interpolation block 730, a stress compensation block 740*a*, a HSV-to-RGB conversion block 760*a* and a stress map memory 770. The controller 700*a* of FIG. 16 may have a similar configuration and a similar operation to the controller 700 of FIG. 13, except that the controller 700*a* may not include a second RGB-to-HSV conversion block 750 illustrated in FIG. 13, and that the HSV-to-RGB conversion block 760*a* may receive a saturation value S2 and a brightness value V2 for each pixel from the stress compensation block 740*a***.

The stress compensation block **740*a* may receive HSV data HSVD converted from input image data IDAT from the first RGB-to-HSV conversion block 710, may receive a stress value SV for each pixel from the stress map interpolation block 730, and may generate compensated image data CDAT' for the pixel by compensating the HSV data HSVD for the pixel based on the stress value SV for the pixel. Thus, the stress compensation block 740*a* may perform a stress compensation operation in a HSV domain, and the compensated image data CDAT' may have a HSV data format. For example, the stress compensation block 740*a*** may generate the compensated image data CDAT' by increasing a brightness component of the HSV data HSVD for each pixel.

The HSV-to-RGB conversion block **760*a* may receive a hue component of the HSV data (or the input image data IDAT) for each pixel as a hue value H1 for each pixel from the first RGB-to-HSV conversion block 710, may receive a saturation component and a brightness component of the compensated image data CDAT' for the pixel as a saturation value S2 and a brightness value V2 for the pixel from the stress compensation block 740*a***, and may generate output image data ODAT for the pixel by converting the hue value H1, the saturation value S2, and the brightness value V2 for the pixel into an RGB image data format. Accordingly, since the output image data ODAT is generated based on the saturation value S2 and the brightness value V2 of the compensated image data CDAT', the output image data ODAT may compensate for a light stress for each pixel. Further, since the output image data ODAT is generated based on the hue value H1 of the input image data IDAT, a color change (or a color shift) caused by light stress compensation may be reduced or prevented in an image displayed based on the output image data ODAT.

Figure 17:
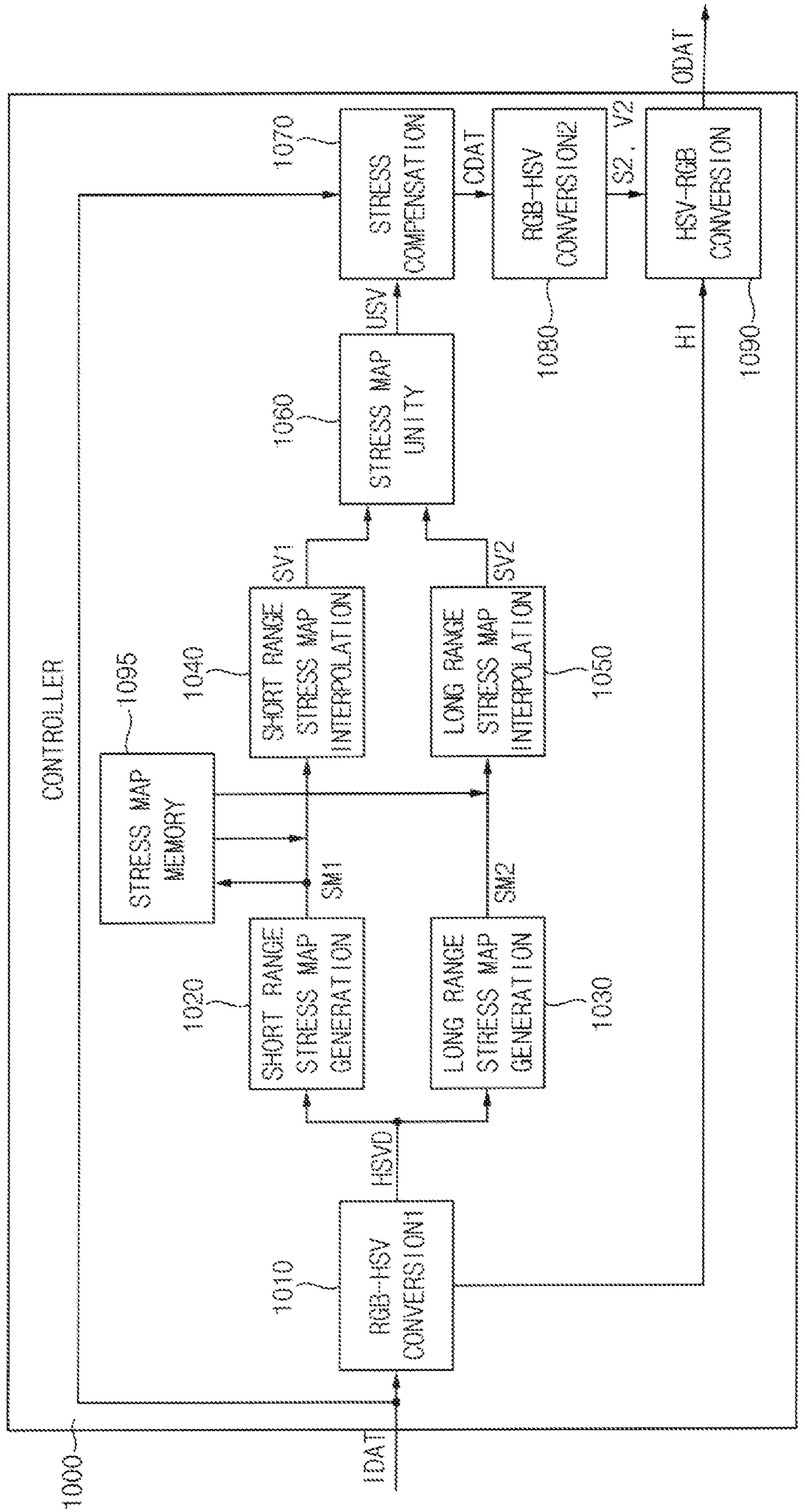
FIG. 17 is a block diagram illustrating a controller included in a display device according to an embodiment.

FIG. 17 is a block diagram illustrating a controller included in a display device according to an embodiment.

Referring to FIG. 17, a controller 1000 may receive input image data IDAT for a display panel, may determine a hue value H1 for each pixel based on the input image data IDAT, may divide the display panel into a plurality of first pixel blocks each having a first size, may divide the display panel into a plurality of second pixel blocks each having a second size different from the first size, and may generate a first stress map SM1 for the plurality of first pixel blocks and a second stress map SM2 for the plurality of second pixel blocks based on the input image data IDAT. The controller 1000 may generate compensated image data CDAT by compensating the input image data IDAT based on the first stress map SM1 and the second stress map SM2, and may determine a saturation value S2 and a brightness value V2 for each pixel based on the compensated image data CDAT. Further, for each pixel, the controller 1000 may generate output image data ODAT based on the hue value H1 of the input image data IDAT, and the saturation value S2 and the brightness value V2 of the compensated image data CDAT.

To perform these operations, the controller 1000 according to some embodiments may include a first RGB-to-HSV conversion block 1010, a first stress map generation block 1020, a second stress map generation block 1030, a first stress map interpolation block 1040, a second stress map interpolation block 1050, a stress map unity block 1060, a stress compensation block 1070, a second RGB-to-HSV conversion block 1080 and a HSV-to-RGB conversion block 1090. In some embodiments, the controller 1000 may further include a stress map memory 1095.

The first RGB-to-HSV conversion block 1010 may convert the input image data IDAT into first HSV data HSVD. The first RGB-to-HSV conversion block 1010 may correspond to a first RGB-to-HSV conversion block 710 illustrated in FIG. 13.

The first stress map generation block 1020 may generate the first stress map SM1 for the plurality of first pixel blocks each having the first size, and the second stress map generation block 1030 may generate the second stress map SM2 for the plurality of second pixel blocks each having the second size different from the first size. The stress map memory 1095 may store the first stress map SM1, but may not store the second stress map SM2. The first stress map generation block 1020 and the second stress map generation block 1030 may correspond to a first stress map generation block 220 and a second stress map generation block 230 illustrated in FIG. 3. Further, the stress map memory 1095 may correspond to a stress map memory 280 illustrated in FIG. 3.

The first stress map interpolation block 1040 may calculate a first stress value SV1 for each pixel based on the first stress map SM1, the second stress map interpolation block 1050 may calculate a second stress value SV2 for each pixel based on the second stress map SM2, and the stress map unity block 1060 may generate a united stress value USV for each pixel by calculating an average (or a weighted average) of the first stress value SV1 and the second stress value SV2 for the pixel. The first stress map interpolation block 1040, the second stress map interpolation block 1050 and the stress map unity block 1060 may correspond to a first stress map interpolation block 240, a second stress map interpolation block 250 and a stress map unity block 260 illustrated in FIG. 3.

The stress compensation block 1070 may generate the compensated image data CDAT for each pixel by compensating the input image data DAT for the pixel based on the united stress value USV for the pixel. The stress compensation block 1070 may correspond to a stress compensation block 270 illustrated in FIG. 3 or a stress compensation block 740 illustrated in FIG. 13.

The second RGB-to-HSV conversion block 1080 may convert the compensated image data CDAT into second HSV data. The second RGB-to-HSV conversion block 1080 may correspond to a second RGB-to-HSV conversion block 750 illustrated in FIG. 13.

The HSV-to-RGB conversion block 1090 may receive the hue value H1 of the first HSV data HSVD for each pixel from the first RGB-to-HSV conversion block 1010, may receive the saturation value S2 and the brightness value V2 of the second HSV data for the pixel from the second RGB-to-HSV conversion block 1080, and may generate the output image data ODAT for the pixel by converting the hue value H1, the saturation value S2 and the brightness value V2 for the pixel into an RGB image data format. The HSV-to-RGB conversion block 1090 may correspond to an HSV-to-RGB conversion block 760 illustrated in FIG. 13.

As described above, in the controller 1000 according to some embodiments may generate the first stress map SM1 for the plurality of first pixel blocks and the second stress map SM2 for the plurality of second pixel blocks, and may generate the output image data ODAT based on the hue value H1 of the input image data DAT, and the saturation value S2 and the brightness value V2 of the compensated image data CDAT that are compensated based on the first stress map SM1 and the second stress map SM2. Accordingly, not only a light stress by a pixel located at a short distance, but also a light stress by a pixel located at a long distance may be compensated, and a color change caused by light stress compensation may be reduced or prevented.

Figure 18:
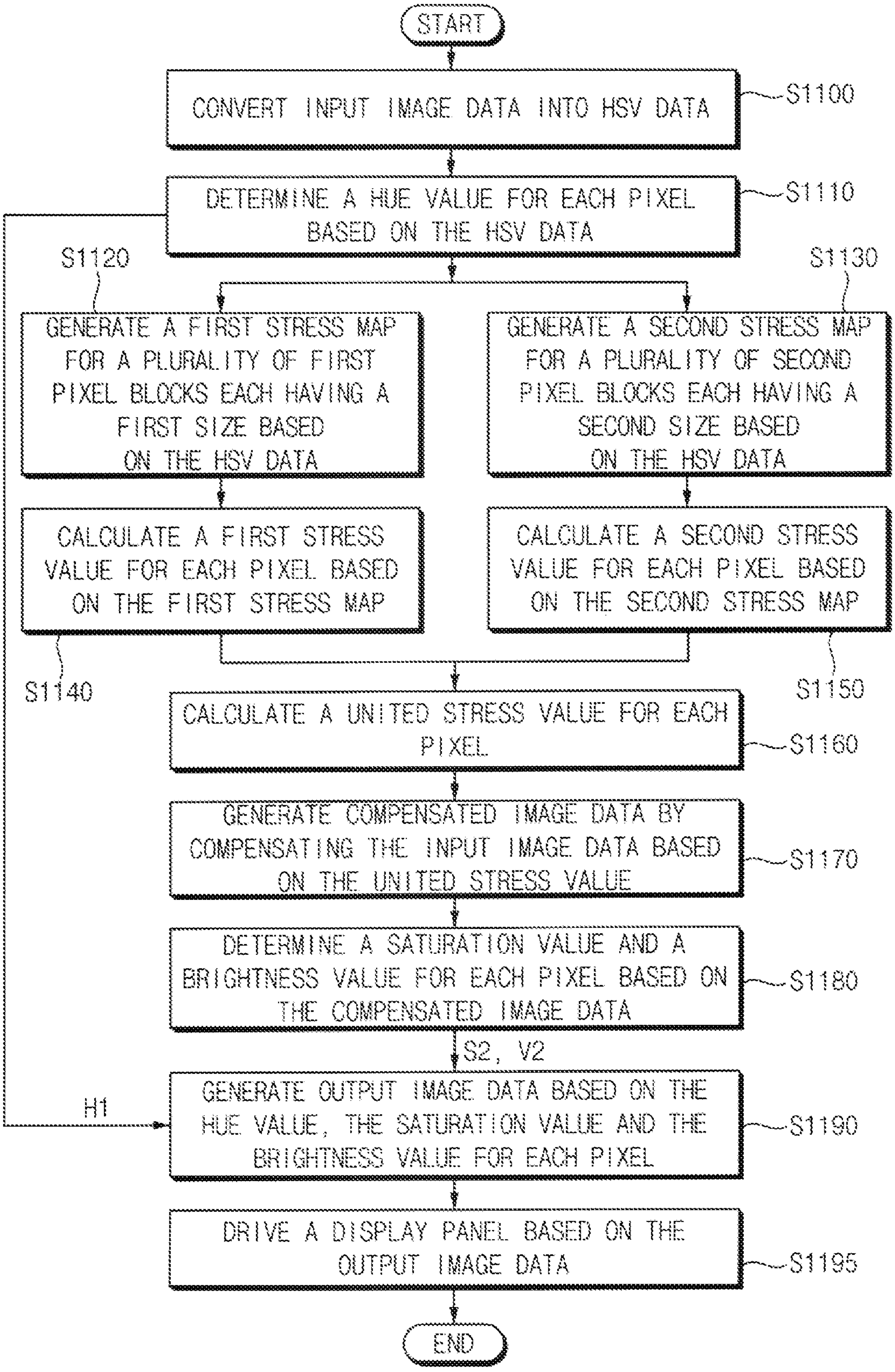
FIG. 18 is a flowchart illustrating a method of operating a display device according to an embodiment.

FIG. 18 is a flowchart illustrating a method of operating a display device according to an embodiment.

Referring to FIGS. 17 and 18, a first RGB-to-HSV conversion block 1010 of a controller 1000 may convert input image data DAT into first HSV data HSVD (S1100). Further, the first RGB-to-HSV conversion block 1010 may determine a hue value H1 for each pixel based on the first HSV data HSVD (S1110).

A first stress map generation block 1020 of the controller 1000 may generate a first stress map SM1 for a plurality of first pixel blocks each having a first size (S1120), and a second stress map generation block 1030 of the controller 1000 may generate a second stress map SM2 for a plurality of second pixel blocks each having a second size different from the first size (S1130). A first stress map interpolation block 1040 of the controller 1000 may calculate a first stress value SV1 for each pixel based on the first stress map SM1 (51140), a second stress map interpolation block 1050 of the controller 1000 may calculate a second stress value SV2 for each pixel based on the second stress map SM2 (51150), and a stress map unity block 1060 of the controller 1000 may calculate a united stress value USV for each pixel by calculating an average (or a weighted average) of the first stress value SV1 and the second stress value SV2 for the pixel (S1160).

A stress compensation block 1070 of the controller 1000 may generate compensated image data CDAT for each pixel by compensating the input image data DAT for the pixel based on the united stress value USV for the pixel (S1170). A second RGB-to-HSV conversion block 1080 of the controller 1000 may determine a saturation value S2 and a brightness value V2 for each pixel based on the compensated image data CDAT (S1180).

An HSV-to-RGB conversion block 1090 of the controller 1000 may receive the hue value H1 for each pixel from the first RGB-to-HSV conversion block 1010, may receive the saturation value S2 and the brightness value V2 for the pixel from the second RGB-to-HSV conversion block 1080, and may generate output image data ODAT for the pixel by converting the hue value H1, the saturation value S2, and the brightness value V2 for the pixel into an RGB image data format (S1190). A data driver of a display device may receive the output image data ODAT from the controller 1000, and may drive the display panel based on the output image data ODAT (S1195). Accordingly, not only a light stress by a pixel located at a short distance, but is also a light stress by a pixel located at a long distance may be compensated, and a color change caused by light stress compensation may be reduced or prevented.

Figure 19:
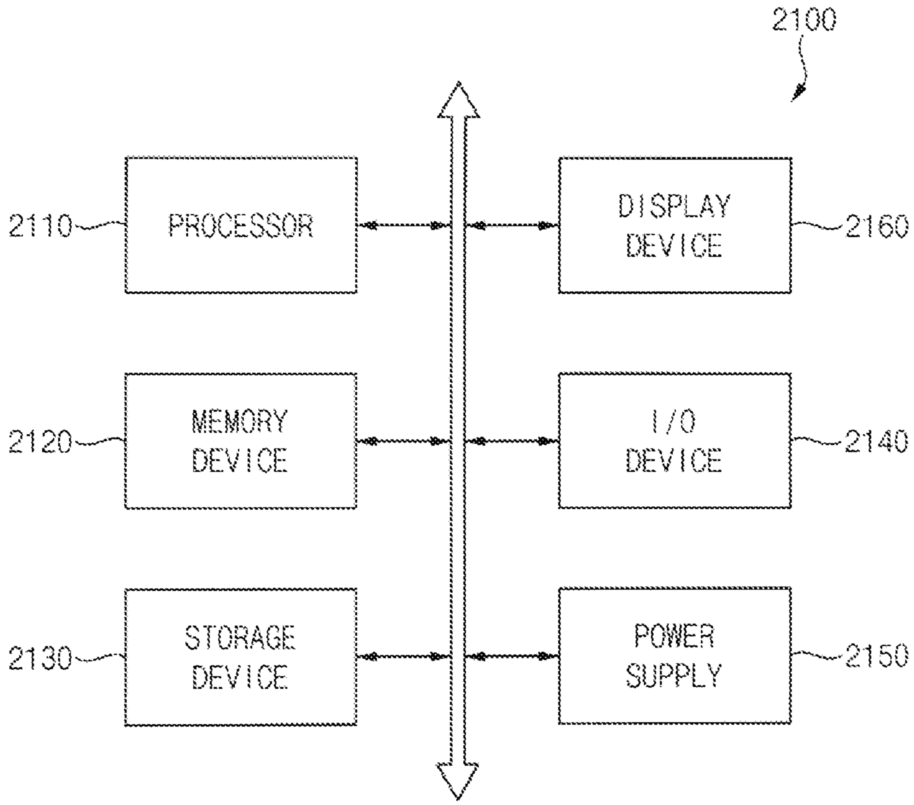
FIG. 19 is a block diagram illustrating an electronic device including a display device according to an embodiment.

FIG. 19 is a block diagram illustrating an electronic device including a display device according to an embodiment.

Referring to FIG. 19, an electronic device 2100 may include a processor 2110, a memory device 2120, a storage device 2130, an input/output (I/O) device 2140, a power supply 2150, and a display device 2160. The electronic device 2100 may further include a plurality of ports for communicating with, for instance, a video card, a sound card, a memory card, a universal serial bus (USB) device, other electric devices, etc.

The processor 2110 may perform various computing functions or tasks. The processor 2110 may be an application processor (AP), a microprocessor, a central processing unit (CPU), etc. The processor 2110 may be coupled to other components via an address bus, a control bus, a data bus, etc. Further, in some embodiments, the processor 2110 may be further coupled to an extended bus, such as a peripheral component interconnection (PCI) bus.

The memory device 2120 may store data for operations of the electronic device 2100. For example, the memory device 2120 may include at least one non-volatile memory device, such as an erasable programmable read-only memory (EPROM) device, an electrically erasable programmable read-only memory (EEPROM) device, a flash memory device, a phase change random access memory (PRAM) device, a resistance random access memory (RRAIVI) device, a nano floating gate memory (NFGM) device, a polymer random access memory (PoRAM) device, a magnetic random access memory (MRAM) device, a ferroelectric random access memory (FRAM) device, etc., and/or at least one volatile memory device, such as a dynamic random access memory (DRAM) device, a static random access memory (SRAM) device, a mobile dynamic random access memory (mobile DRAM) device, etc.

The storage device 2130 may be a solid-state drive (SSD) device, a hard disk drive (HDD) device, a CD-ROM device, etc. The I/O device 2140 may be an input device, such as a keyboard, a keypad, a mouse, a touch screen, etc., and an output device, such as a printer, a speaker, etc. The power supply 2150 may supply power for operations of the electronic device 2100. The display device 2160 may be coupled to other components via the buses or other communication links.

In the display device 2160, a controller may generate a stress map, and may compensate image data based on the stress map. Accordingly, a light stress to each pixel may be compensated. In some embodiments, the controller may generate a first stress map for a plurality of first pixel blocks each having a first size and a second stress map for a plurality of second pixel blocks each having a second size different from the first size, and may compensate image data based on the first stress map and the second stress map. Accordingly, not only a light stress by a first pixel spaced apart by a short distance from a pixel, but also a light stress by a second pixel spaced apart by a long distance from the pixel may be compensated. In other embodiments, the controller may generate output image data based on a hue value of input image data, a saturation value of image data compensated based on a stress map, and a brightness value of the compensated image data. Accordingly, a color change (or a color shift) caused by light stress compensation may be reduced or prevented.

According to embodiments, the electronic device 2100 may be any electronic device including the display device 2160, such as a digital television, a three dimensional (3D) television, a personal computer (PC), a home appliance, a laptop computer, a cellular phone, a smart phone, a tablet computer, a wearable device, a personal digital assistant (PDA), a portable multimedia player (PMP), a digital camera, a music player, a portable game console, a navigation system, etc.

Although certain embodiments and implementations have been described herein, other embodiments and modifications will be apparent from this description. Accordingly, the inventive concepts are not limited to such embodiments, but rather to the broader scope of the accompanying claims and various obvious modifications and equivalent arrangements as would be apparent to one of ordinary skill in the art.

What is claimed is:

1. A display device comprising:
- a display panel comprising a plurality of pixels;
- a controller configured to:
  - receive input image data for the display panel;
  - divide the display panel into a plurality of first pixel blocks, each of the plurality of first pixel blocks having a first size;
  - divide the display panel into a plurality of second pixel blocks, each of the plurality of second pixel blocks having a second size different from the first size;
  - generate, based on the input image data, a first stress map for the plurality of first pixel blocks and a second stress map for the plurality of second pixel blocks;
  - calculate a united stress value for each of the plurality of pixels based on the first stress map and the second stress map; and
  - generate output image data by compensating the input image data for each of the plurality of pixels based on the united stress value for each of the plurality of pixels; and
- a data driver configured to provide data voltages to the plurality of pixels based on the output image data,
- wherein the controller is configured to:
  - calculate a first stress value for each of the plurality of pixels based on the first stress map;
  - calculate a second stress value for each of the plurality of pixels based on the second stress map;
  - calculate the united stress value for each of the plurality of pixels by applying a first weight to the first stress value and applying a second weight to the second stress value; and
  - generate the output image data for each of the plurality of pixels by compensating the input image data for each of the plurality of pixels based on the united stress value for each of the plurality of pixels.

2. The display device of claim 1, wherein:
- a second width of each of the plurality of second pixel blocks is N times a first width of each of the plurality of first pixel blocks, where N is an integer greater than 1; or
- a second height of each of the plurality of second pixel blocks is M times a first height of each of the plurality of first pixel blocks, where M is an integer greater than 1.

3. The display device of claim 1, wherein the controller is configured to:
- calculate brightness values for the plurality of pixels based on the input image data;
- generate the first stress map representing a first block stress value of each of the plurality of first pixel blocks by calculating an average of the brightness values of the plurality of pixels included in each of the plurality of first pixel blocks; and
- generate the second stress map representing a second block stress value of each of the plurality of second pixel blocks by calculating an average of the brightness values of the plurality of pixels included in each of the plurality of second pixel blocks.

4. The display device of claim 1, wherein the controller is configured to:
- calculate brightness values for the plurality of pixels based on the input image data;
- generate the first stress map representing a first block stress value of each of the plurality of first pixel blocks by calculating an average of the brightness values of the plurality of pixels in each of the plurality of first pixel blocks; and
- generate the second stress map representing a second block stress value of each of the plurality of second pixel blocks by calculating an average of the first block stress values of the plurality of first pixel blocks included in each of the plurality of second pixel blocks.

5. A display device of claim 1, comprising:
- a display panel comprising a plurality of pixels;
- a controller configured to:
  - receive input image data for the display panel;
  - divide the display panel into a plurality of first pixel blocks, each of the plurality of first pixel blocks having a first size;
  - divide the display panel into a plurality of second pixel blocks, each of the plurality of second pixel blocks having a second size different from the first size;
  - generate, based on the input image data, a first stress map for the plurality of first pixel blocks and a second stress map for the plurality of second pixel blocks;
  - calculate a united stress value for each of the plurality of pixels based on the first stress map and the second stress map; and generate output image data by compensating the input image data for each of the plurality of pixels based on the united stress value for each of the plurality of pixels; and a data driver configured to provide data voltages to the plurality of pixels based on the output image data, wherein:

the controller is configured to calculate the output image data for each of the plurality of pixels by adding a stress compensation value to the input image data for each of the plurality of pixels; and the stress compensation value for each of the plurality of pixels increases as the united stress value for each of the plurality of pixels calculated based on the first and second stress maps increases, and decreases as a gray level of the input image data for each of the plurality of pixels increases.

6. The display device of claim 1, wherein the controller is configured to:

determine a stress compensation reference value corresponding to the united stress value for each of the plurality of pixels calculated based on the first and second stress maps;

output the input image data for each of the plurality of pixels as the output image data for each of the plurality of pixels in response to the input image data for each of the plurality of pixels being greater than or equal to an inflection point value; and calculate the output image data for each of the plurality of pixels using an equation "ODAT=(IPV-SCMPV) *IDAT/IPV+SCMPV" in response to the input image data for each of the plurality of pixels being less than the inflection point value, where ODAT represents the output image data, IPV represents the inflection point value, SCMPV represents the stress compensation reference value, and IDAT represents the input image data.

7. The display device of claim 1, wherein the controller comprises:

an RGB-to-HSV conversion block configured to convert the input image data into HSV data;

a first stress map generation block configured to generate the first stress map representing first block stress values of the plurality of first pixel blocks based on the HSV data;

a second stress map generation block configured to generate the second stress map representing second block stress values of the plurality of second pixel blocks based on the HSV data;

a first stress map interpolation block configured to calculate a first stress value for each of the plurality of pixels by performing a bilinear interpolation operation on the first block stress values of the first stress map;

a second stress map interpolation block configured to calculate a second stress value for each of the plurality of pixels by performing a bilinear interpolation operation on the second block stress values of the second stress map;

a stress map unity block configured to calculate the united stress value for each of the plurality of pixels by applying a first weight to the first stress value and by applying a second weight to the second stress value; and a stress compensation block configured to generate the output image data for each of the plurality of pixels by compensating the input image data for each of the plurality of pixels based on the united stress value for each of the plurality of pixels.

8. The display device of claim 7, wherein the controller further comprises:

a stress map memory configured to store the first stress map and not store the second stress map.

9. The display device of claim 1, wherein the controller comprises:

an average data calculation block configured to generate average data by calculating an average of the input image data for each of the plurality of pixels;

a first stress map generation block configured to generate the first stress map representing first block stress values of the plurality of first pixel blocks based on the average data;

a second stress map generation block configured to generate the second stress map representing second block stress values of the plurality of second pixel blocks based on the average data;

a first stress map interpolation block configured to calculate a first stress value for each of the plurality of pixels by performing a bilinear interpolation operation on the first block stress values of the first stress map;

a second stress map interpolation block configured to calculate a second stress value for each of the plurality of pixels by performing a bilinear interpolation operation on the second block stress values of the second stress map;

a stress map unity block configured to calculate the united stress value for each of the plurality of pixels by applying a first weight to the first stress value and applying a second weight to the second stress value; and a stress compensation block configured to generate the output image data for each of the plurality of pixels by compensating the input image data for each of the plurality of pixels based on the united stress value for each of the plurality of pixels.

10. The display device of claim 1, wherein the controller further configured to:

divide the display panel into a plurality of third pixel blocks, each of the plurality of third pixel blocks having a third size different from the first size and the second size;

generate a third stress map for the plurality of third pixel blocks based on the input image data; and generate the output image data by compensating the input image data based on the first stress map, the second stress map, and the third stress map.

11. A display device comprising:

a display panel comprising a plurality of pixels;

a controller configured to:

receive input image data for the display panel;

determine a hue value for each of the plurality of pixels based on the input image data;

divide the display panel into a plurality of pixel blocks;

generate a stress map for the plurality of pixel blocks based on the input image data;

generate compensated image data by compensating the input image data based on the stress map;

determine a saturation value and a brightness value for each of the plurality of pixels based on the compensated image data; and generate output image data based on the hue value, the saturation value, and the brightness value for each of the plurality of pixels; and a data driver configured to provide data voltages to the plurality of pixels based on the output image data, wherein the controller comprises:

a first RGB-to-HSV conversion block configured to convert the input image data into first HSV data;

a stress map generation block configured to generate the stress map representing block stress values of the plurality of pixel blocks based on the first HSV data;

a stress map interpolation block configured to calculate a stress value for each of the plurality of pixels by performing a bilinear interpolation operation on the block stress values of the stress map;

a stress compensation block configured to generate the compensated image data for each of the plurality of pixels by compensating the input image data for each of the plurality of pixels based on the stress value for each of the plurality of pixels;

a second RGB-to-HSV conversion block configured to convert the compensated image data into second HSV data; and a HSV-to-RGB conversion block configured to:

receive a hue component of the first HSV data for each of the plurality of pixels as the hue value for each of the plurality of pixels;

receive a saturation component and a brightness component of the second HSV data for each of the plurality of pixels as the saturation value and the brightness value for each of the plurality of pixels; and generate the output image data for each of the plurality of pixels by converting the hue value, the saturation value, and the brightness value for each of the plurality of pixels into an RGB image data format.

12. The display device of claim 11, wherein the controller is configured to:

convert the input image data into first HSV data;

determine a hue component of the first HSV data for each of the plurality of pixels as the hue value for each of the plurality of pixels;

convert the compensated image data into second HSV data; and determine a saturation component and a brightness component of the second HSV data for each of the plurality of pixels as the saturation value and the brightness value for each of the plurality of pixels, respectively.

13. The display device of claim 11, wherein the controller is configured to:

generate the output image data for each of the plurality of pixels by converting the hue value, the saturation value, and the brightness value for each of the plurality of pixels into an RGB image data format.

14. The display device of claim 11, wherein the controller further comprises:

a stress map memory configured to store the stress map.

* * * * *